United States Patent
Lee et al.

(10) Patent No.: US 8,514,474 B2
(45) Date of Patent: Aug. 20, 2013

(54) THREE-DIMENSIONAL DISPLAY DEVICE

(75) Inventors: Chia-Yen Lee, Taoyuan Hsien (TW); Ching-Tung Hsu, Taoyuan Hsien (TW); Ming-Wei Tsai, Taoyuan Hsien (TW); Yeong-Feng Wang, Taoyuan Hsien (TW); Yen-I Chou, Taoyuan Hsien (TW); Rong-Chang Liang, Cupertino, CA (US)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 34 days.

(21) Appl. No.: 13/221,321

(22) Filed: Aug. 30, 2011

(65) Prior Publication Data
US 2013/0050807 A1    Feb. 28, 2013

(51) Int. Cl.
*G02B 26/02*    (2006.01)

(52) U.S. Cl.
USPC .......................................................... 359/228

(58) Field of Classification Search
USPC .................. 359/227, 228, 237, 245, 252, 253, 359/259, 315, 316, 318, 320, 665; 345/41, 345/60, 84
See application file for complete search history.

(56) References Cited

U.S. PATENT DOCUMENTS

| | | | |
|---|---|---|---|
| 6,369,954 B1 | 4/2002 | Berge et al. | |
| 7,474,470 B2 | 1/2009 | Cernasov | |
| 7,548,363 B2 * | 6/2009 | Hayes et al. | 359/276 |
| 7,688,509 B2 | 3/2010 | Vissenberg et al. | |
| 7,817,343 B2 | 10/2010 | Choi et al. | |
| 8,213,090 B2 * | 7/2012 | Wang et al. | 359/665 |
| 2009/0257111 A1 | 10/2009 | Heikenfeld et al. | |
| 2009/0316003 A1 | 12/2009 | Hirsa et al. | |

OTHER PUBLICATIONS

Hayes et al., "Video-speed electronic paper based on electrowetting," Nature, Sep. 25, 2003, pp. 383-385, vol. 425.
Lopez et al., "Electrochemically activiated adaptive lens," Applied Physics Letters, 2005, pp. 134102-1-134102-3, vol. 87.

* cited by examiner

*Primary Examiner* — Tuyen Tra
(74) *Attorney, Agent, or Firm* — Muncy, Geissler, Olds & Lowe, PLLC

(57) ABSTRACT

A 3D image display device with high resolution is disclosed. The device may deflect left and right eye images to a left and right eye of a viewer, respectively. As such, the viewer may see 3D images. The 3D image display device includes a plurality of electrically switchable light modulating cells containing two incompatible light modulating mediums. When a voltage is applied to electrodes of the electrically switchable light modulating cell, the interface between the incompatible light modulating mediums non-horizontally deforms corresponding to the electrowetting or electrostatic concept. The geometrical shape, size, and material of partition walls in the electrically switchable light modulating cells may reduce or eliminate misplacement of incompatible light modulating mediums while voltages are applied thereto. In addition, the method of manufacturing the 3D image display device is also disclosed.

5 Claims, 49 Drawing Sheets

THREE-DIMENSIONAL DISPLAY DEVICE

BACKGROUND OF THE INVENTION

1. Field of the Invention

The present invention relates to a three-dimensional (3D) image display device, and in particular relates to a naked-eye type 3D image display device, and an image display device, and electrically switchable light modulating cells thereof.

2. Description of the Related Art

In Nature 425, 383 (2003), Hayes et al. discloses a novel on/off switch method, which applies an electrowetting principle to control colored oils. This technology has several advantages such as high color saturation, high image response speed, and low energy consumption, as compared to conventional technologies. Therefore, electrowetting was soon applied in the display technology field thereafter.

In U.S. Patent Publication No. 2009/0257111, a tunable optical array device includes a substrate on which a TFT tuning circuitry is disposed thereon for controlling an upper layered cell array, as shown in FIG. 1. Two incompatible fluids having different polarities are filled in cells of the cell array, and the shape of the interface between the fluids is controlled by lower layered TFT tuning circuitry. Accordingly, phase modulation and beam deflection of light beams traveling through the cell array may be controlled. Also disclosed are driving methods of the TFT tuning circuitry. However, using a TFT driving mechanism may dramatically reduce the aperture ratio of the display. While an interconnect layer is also disclosed, the brightness of the display is reduced by the multi-layered structure of the interconnect layer. An electrowetting display having multiple cells is applied in a holographic reconstruction system. Interference fringes of light beams are generated through the electrowetting cells. The electrowetting display may deflect the light beams traveling therethrough to the eyes of a viewer. Although the electrowetting display may deflect light beams, it lacks the concept of time-multiplexing. The electrowetting device may be applied in retro-reflective panels, image projection devices, and holographic projection reconstructing equipments.

U.S. Pat. No. 7,474,470, titled "Devices and methods for redirecting light", discloses a light redirecting device including a display element and a plurality of redirecting elements thereon, as shown in FIG. 2. There is no special structure or hydrophilic layer on interior surfaces 106a-c of the redirecting element, such that liquids L1 and L2 may be misplaced. The liquids L1 and L2 are incompatible, and interface shape between the liquids may be controlled by a top electrode 110. By switching the electrode, the liquid interface forms several shapes to redirect light for display 3D images. In addition, the light direction may not be exactly controlled due to the fact that the contact angle of the liquids may mistake while a voltage is applied to the light redirecting element.

U.S. Pat. No. 7,817,343, titled "Electrowetting lens", discloses an electrowetting lens, which includes two fluids of different polarities. The liquid surface may be controlled by applying same voltages to first and second electrodes, respectively. For saving the energy, only the electrodes near the liquid surface (not all electrodes) are driven by the voltage. However, this design needs a specific circuit layout to individually control each electrode, and it may increase design complexity.

In related arts, liquid lenses made of mini-scaled capillary array devices have been manufactured by micro-electro-mechanical system (MEMS) processes. The capillary surface may be an interface between a gas and a liquid or between two liquids, and the shape of the interface is determined by surface tension of the liquids. In Applied Physics Letters 87, pp. 134102 (2005), Hirsa et al. published a paper titled "Electrochemically Activated Adaptive Liquid Lens", a reversible capillary switch having low energy consumption is formed on a single chip.

U.S. Publication No. 2009/0316003, titled "Pinned-contact oscillating liquid lens and image system", discloses an oscillating liquid lens, which utilizes the capillary force between the liquid droplet and the channel of the liquid lens to support the liquid droplet. The liquid lens is driven by changing the chamber pressure, thereby deforming a first part of the liquid droplet and a second part of the liquid droplet. As such, an incident light traveling through the chamber may be focused or diffused.

Displays capable of showing stereoscopic images or animation are called three-dimensional (3D) image displays. Major developments in the 3D display fields have led to two types of technologies: a polarized glasses type and a naked-eye type. Meanwhile, 3D display effects may also be theoretically accomplished by using holography. However, holography needs small pixels and huge memory/calculation speeds. The naked-eye type is an easier 3D display method due to the fact that only a beam control element is located, such as a barrier layer or a lenticular lens, directly before the display. As such, the deflect direction of the light beam may be changed or controlled by the naked-eye type, such that right eye images and left eye images may be deflected into the right eye and the left eye of a viewer, respectively.

In U.S. Pat. No. 6,369,954, titled "Lens with variable focus", a lens having an adjustable focal length is disclosed. The lens includes a chamber filled by a first fluid and a second fluid, wherein the droplet-shaped second fluid contacts the chamber surface. The first and second fluids are transparent fluids of different refractive indexes, and they are incompatible to each other. An electrode is plated on the chamber surface to contact and surround the chamber surface. Because the first and second fluids have different fluid properties, the interface curvature ratio between the first and second fluids may be changed by applying an external voltage. The focal length of the incident light may be adjusted by changing the interface curvature ratio between the first and second fluids.

U.S. Pat. No. 7,688,509, titled "AUTOSTEREOSCOPIC DISPLAY", discloses liquid lenses, collocated with splitting screens, to display 3D images. The electrodes in an electrowetting cell include side electrodes and a bottom electrode. The electrowetting lens is operable by applying different voltages to the side electrodes and the bottom electrode, such that a curvature ratio or a tilt ratio of the interference of the two incompatible fluids is tuned to modulate the emission direction of light beams traveling therethrough.

According to related arts, the light modulating element manufactured of the electrowetting concept has problems as below. The polar and non-polar solvents injected in the light modulating element have similar densities. When the adhesive force between the liquids and the surface of the light modulating element is insufficient, the first and second liquids may be misplaced. Furthermore, the first fluid surface is easily deformed when applied with a voltage, and the first and second fluids are easily misplaced due to insufficient adhesive forces between the liquids and the surface of the light modulating element. Even if the applied voltage is stopped, the tension between the polar liquid and surrounding object is too small to make the polar fluid return back its original shape/position.

BRIEF SUMMARY OF THE INVENTION

One embodiment of the disclosure provides an electrically switchable light modulating cell, including a first substrate, a first and second electrodes disposed on the first substrate, a dielectric layer formed on the first substrate and covering the first and second electrodes, a partition wall, and a second substrate disposed on the partition wall and having a third electrode. A first and second light modulating media are filled in a compartment defined by the dielectric layer, the second substrate and the partition wall, and the first light and second light modulating media are substantially immiscible and are of different refractive indices. At least one of the second substrate and the partition wall is wettable by at least one of the first and second light modulating media. The first and second light modulating media are capable of adjusting the directions of light beams traveling from the first substrate to the second substrate in accordance with an electric potential difference across the first, the second, and the third electrodes, so that the light beams alternately arrive at either the left eye of a viewer or the right eye of the viewer.

One embodiment of the disclosure provides a light modulating device including a plurality of the described electrically switchable light modulating cells. Each cell includes a first substrate, a first and second electrodes disposed on the first substrate, a dielectric layer formed on the first substrate and covering the first and second electrodes, a partition wall, a second substrate disposed on the partition wall and comprising a third electrode. A first and second light modulating media are filled in a compartment defined by the dielectric layer, the second substrate, and the partition wall. The first light and second light modulating media are substantially immiscible and are of different refractive indices, and a layer is formed on at least one of the second substrate and the partition wall, and the layer is wettable by at least one of the first and second light modulating media.

One embodiment of the disclosure provides a three-dimensional display device, including a light modulating device including a plurality of the described electrically switchable light modulating cells.

One embodiment of the disclosure provides an image display system, including a light modulating device including a plurality of the described electrically switchable light modulating cells.

One embodiment of the disclosure provides an electrically switchable light modulating cell, including a first substrate, a first and second electrodes disposed on the first substrate, a dielectric layer formed on the first substrate and covering the first and second electrodes, a partition wall disposed on the dielectric layer, a second substrate including a low-contact-angle material layer, a third electrode disposed on the second substrate, and a first and second light modulating medium filled in the compartment. The dielectric layer, the second substrate, and the partition wall define a compartment, the first and second light modulating medium are substantially immiscible and are of different refractive indices, and the first and second light modulating media are capable of adjusting the directions of light beams traveling from the first substrate to the second substrate in accordance with an electric potential difference across the first, the second, and the third electrodes, so that the light beams alternately arrive at either the left eye of a viewer or the right eye of the viewer.

One embodiment of the disclosure provides a method for fabricating a light modulating device, including: provides a method for fabricating a light modulating device, including: providing a substrate; forming a transparent conductive layer on the substrate; patterning the transparent conductive layer; forming a dielectric layer on the patterned transparent conductive layer; forming a high-contact-angle material layer on the dielectric layer; forming a partition layer on the high-contact-angle material layer to define a plurality of cells; filling the plurality of cells with a light modulating medium; and attaching a second substrate to the partition layer to seal the plurality of cells.

One embodiment of the disclosure provides a method for fabricating a light modulating device, including: providing a first transparent substrate; forming a partition layer on the first transparent substrate; patterning the partition layer to expose a part of the first transparent substrate and to define a plurality of cells; forming a transparent conductive layer on the patterned partition layer; forming a dielectric layer to cover the transparent conductive layer and the exposed part of first transparent substrate; filling the plurality of cells with a light modulating medium; and attaching a second transparent substrate to the dielectric layer to seal the plurality of cells.

One embodiment of the disclosure provides an electrically switchable light modulating cell, including a first substrate, a partition wall disposed on the first substrate and including a first and second electrodes, a dielectric layer formed on the first substrate and the first and second electrodes, a second substrate disposed on the partition wall to be adjacent to dielectric layer, and the first and second electrodes. The second substrate and the dielectric layer define a compartment, and a first and second light modulating media filled in the compartment. The first and the second light modulating media are substantially immiscible and are of different refractive indices.

One embodiment of the disclosure provides an electrically switchable light modulating cell including a first substrate, a partition wall disposed on the first substrate, a first electrode disposed on part of the partition wall and on part of the first substrate and including two portions interlaced with each other, a second electrode disposed on another part of the partition wall and on another part of the first substrate and including two portions interlaced with each other; a dielectric layer conformably formed on the first and second electrodes, and a second substrate. The second substrate and the dielectric layer define a compartment, and a first and second light modulating media are filled in the compartment. The first and second light modulating media are substantially immiscible and are of different refractive indices.

One embodiment of the disclosure provides a method for fabricating a light modulating device, including: providing a first transparent substrate; forming a first and second electrodes on the first transparent substrate; forming a dielectric layer formed on the first substrate to cover the first and second electrodes; forming a partition wall on the dielectric layer; forming a high-contact-angle material layer on the partition wall and disposed on at least part of the partition wall; forming a second substrate on the partition wall and including third electrode; a first and second light modulating media filled in a compartment defined by the dielectric layer, the second substrate, the high-contact-angle material layer, and the partition wall. The first light and second light modulating media are substantially immiscible and are of different refractive indices.

A detailed description is given in the following embodiments with reference to the accompanying drawings.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

Figure 1:
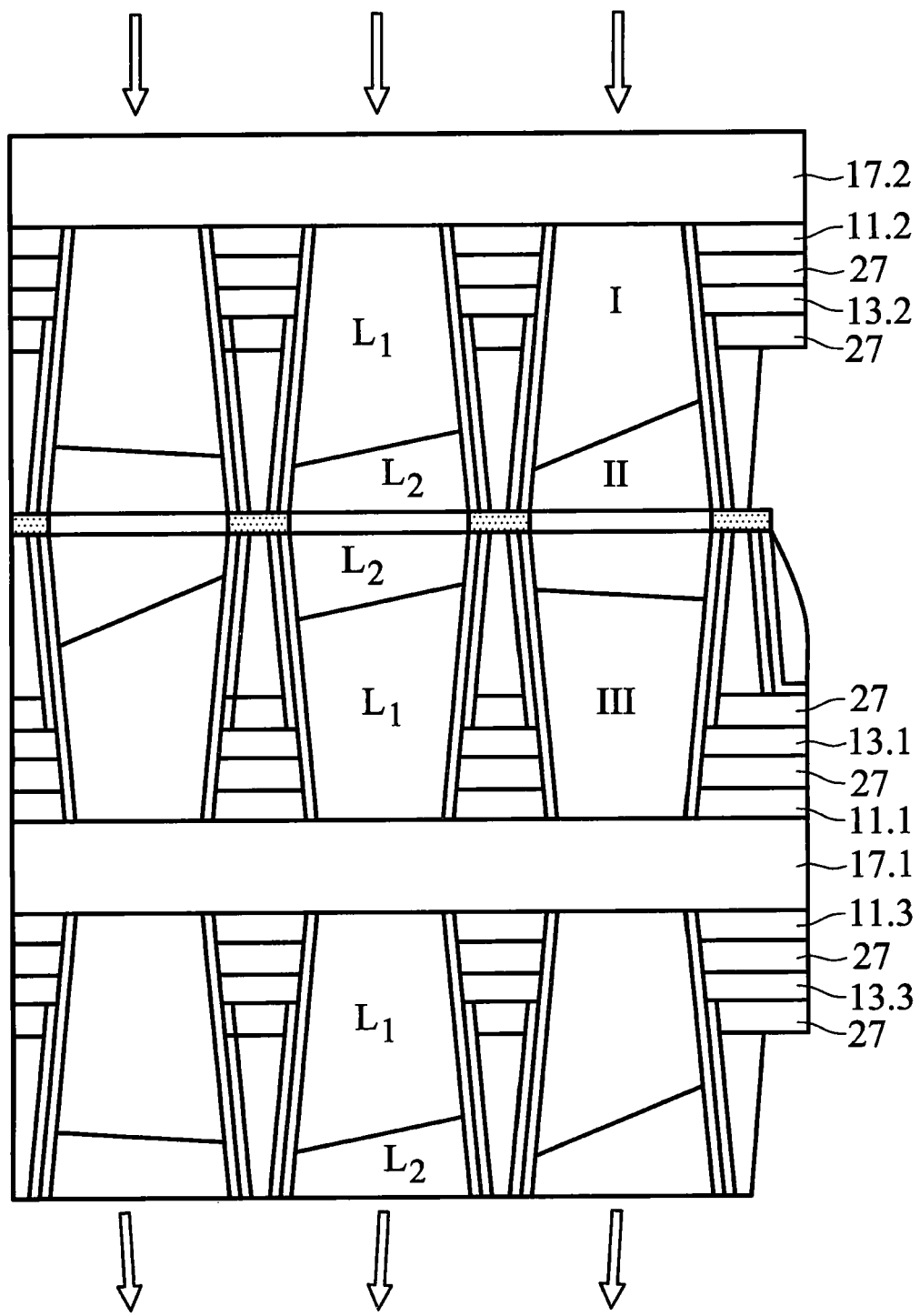
FIG. 1 shows a tunable optical array device in related art.
Figure 2:
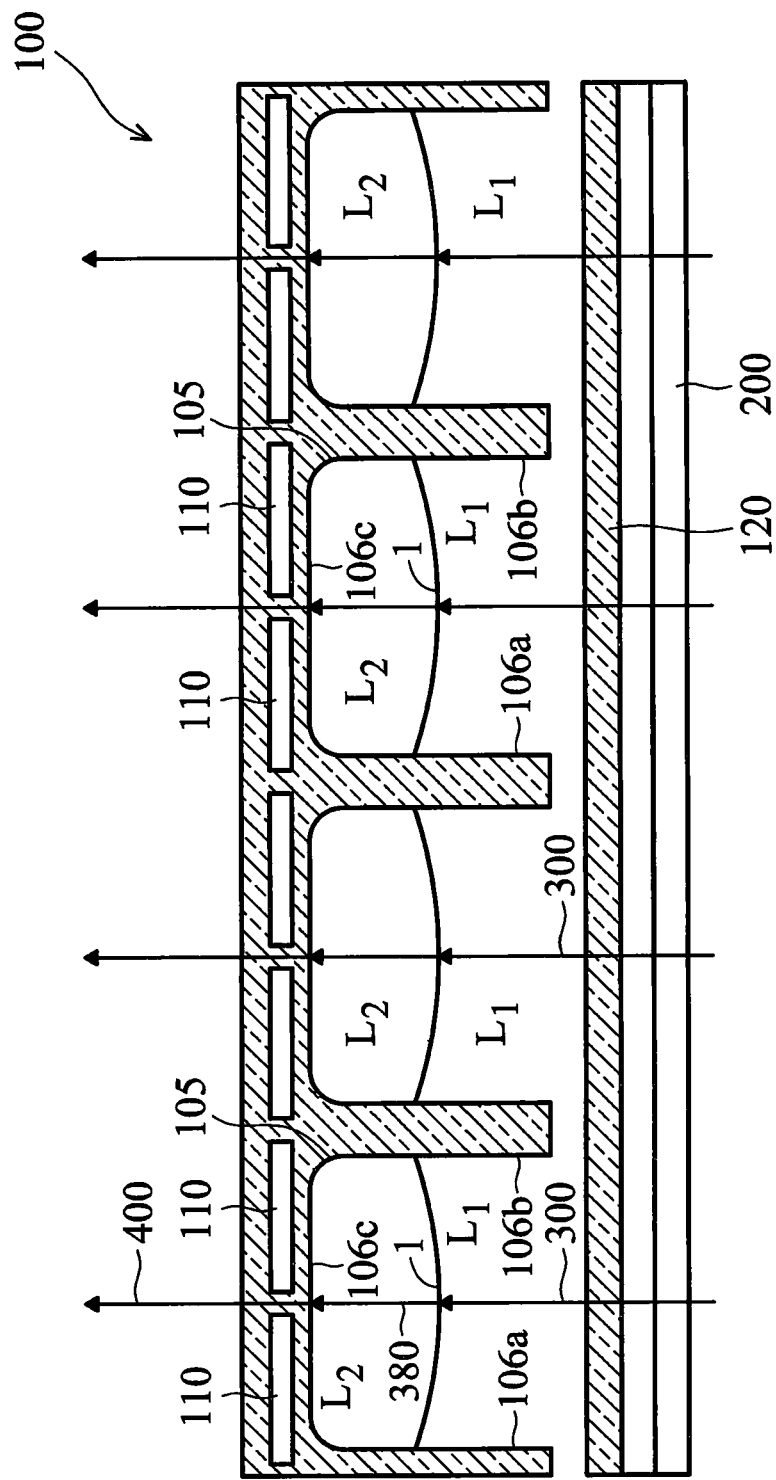
FIG. 2 shows a light redirecting device in related art.

The following description is of the best-contemplated mode of carrying out the invention. This description is made for the purpose of illustrating the general principles of the invention and should not be taken in a limiting sense. The scope of the invention is best determined by reference to the appended claims.

A polar light modulating medium forms droplets having a high contact angle (>90°) on a hydrophobic material surface, and thus the hydrophobic material is a high-contact-angle material for the polar light modulating medium. Moreover, the non-polar light modulating medium form droplets having a low contact angle on the hydrophobic material surface and thus the hydrophobic material is a low-contact-angle material for the non-polar light modulating medium.

A polar light modulating medium forms droplets having a low contact angle (>90°) on a hydrophilic material surface, and thus the hydrophilic material is a low-contact-angle material for the polar light modulating medium. Moreover, the non-polar light modulating medium form droplets having a high contact angle on the hydrophilic material surface and thus the hydrophilic material is a high-contact-angle material for the non-polar light modulating medium.

The conventional lenticular lenses are static passive devices, unable to dynamically modulate direction of light beams. The conventional lenticular lenses also have limitation of visible areas of displays. The 3D image display device of the disclosure may be used to replace the conventional lenticular lenses. In one embodiment, the light modulating medium interface of the display device is controlled by the electrowetting principle, such that the directions of emitting light beams may be dynamically modulated. The display device and the 3D light modulating device are configured to enable time-sharing and synchronization, thereby displaying the 3D images for viewers. Currently, 1 mm electrowetting displays have a refresh time of 3 ms to 10 ms, and 100 µm electrowetting displays have a refresh frequency of 1 kHz to 3 kHz. In general, smaller sized displays have faster driving speeds. If a display has a refresh frequency which is greater than 120 Hz, the display may operate in the time-sharing mode.

According to embodiments of the disclosure, the 3D light modulating device has a plurality of electrically switchable light modulating cells of specific shapes, sizes, and aspect ratios. The electrically switchable light modulating cells are arranged in an array and include at least one light modulating medium. When voltages are applied to the electrically switchable light modulating cells, according to the electrowetting principle, the light modulating medium interface may be changed to a non-horizontal profile such as a concaved, convex, or slanted profile, thereby influencing the direction and/or focus of the light beams of the images.

According to the above embodiments, when two light modulating mediums are adopted to fill the electrically switchable light modulating cells, one, is a hydrophilic (polar) light modulating medium such as, but not limited to, water, saline, and the like. To increase the conductivity of the polar light modulating medium, the polar light modulating medium may be a low molecular salt solution such as lithium chloride solution or potassium chloride solution. Another light modulating medium is a hydrophobic (non-polar) light modulating medium such as, but not limited to, silicone oil, mixture of silicone oil and tetrabromo methane, mineral oil, and hexadecane. In one embodiment of the disclosure, the non-polar light modulating medium has a viscosity of less than 1000× $10^{-6}$ m$^2$·s$^{-1}$. In another embodiment of the disclosure, toluene may be added to the silicone oil to decrease its viscosity. In a further embodiment, at least one of the polar light modulating medium and the non-polar light modulating medium includes a surfactant such as a halogenated organic compound (e.g. trifluoroethanol or sodium trifluoroacetate).

The light modulating device of the disclosure may be driven by an active matrix, or a passive matrix. The passive matrix performs multi-line addressing, row-by-row addressing, column-by-column addressing, or multi-domain addressing, such that the 3D display effect is easily achieved by a simpler addressing mode. The light modulating device may be driven by a simple passive matrix without TFTs, thereby increasing the aperture ratio of the 3D image display system. The passive matrix is driven by multi-line or the multi-domain addressing, such that designs of the conductive lines thereof are simple. For example, the designs may need only two layered connections (e.g., ITO) without a complicated layout, and the brightness of the 3D image display system is not reduced by a complicated layout.

In one embodiment of the disclosure, the geometrical shape, size, and material of partition walls in the electrically switchable light modulating cell may determine the capillary force between the polar light modulating medium and the partition wall. The higher capillary force therebetween may reduce or eliminate misplacement of different light modulating mediums, and further improve the homing ability of the light modulating medium.

The three-dimensional display device of the disclosure may collocate with electronic paper, and an electronic reader, Electroluminescent display (ELD), Organic electroluminescent display (OELD), Vacuum fluorescent display (VFD), Light emitting diode display (LED), Cathode ray tube (CRT), Liquid crystal display (LCD), Plasma display panel (PDP), Digital light processing (DLP) display, Liquid crystal on silicon (LCoS), Organic light-emitting diode (OLED), Surface-conduction electron-emitter display (SED), Field emission display (FED), Laser TV (Quantum dot laser; Liquid crystal laser), Ferro liquid display (FLD), Interferometric modulator display (iMoD), Thick-film dielectric electroluminescent display (TDEL), Quantum dot display (QD-LED), Telescopic pixel display (TPD), Organic light-emitting transistor (OLET), Electrochromic display, and Laser phosphor display (LPD).

The three-dimensional display device of the disclosure includes top and bottom transparent substrates, having high transparency and carrying elements therebetween. The suitable substrates may be polymer sheet, metal sheet, and inorganic sheet. The polymer sheet includes polyethylene terephthalate, polyethylene naphthalate, polyethersulfone, polyethylene, polycarbonate, polyimide, or acryl. The metal sheet may be selected from flexible materials. The inorganic sheet includes glass, quartz, or other non-flexible (rigid) materials. In one embodiment, the substrate may have a thickness of 2 μm to 5000 μm, and preferably of 5 μm to 2000 μm. An overly thin substrate does not have sufficient strength and an average thickness. An overly thick substrate, e.g. thicker than 5000 μm, may be unfavorable for display effect of thin-type displays.

The three-dimensional display device of the disclosure includes a dielectric layer for electrically insulating leakage current of working electrodes due to charged ion drifting (e.g. ion mobility in the polar light modulating medium). The dielectric layer may be inorganic materials, organic materials, or composites thereof. In one embodiment, the dielectric layer may have a thickness of 1 nm to 10000 nm. The dielectric layer may have different suitable thicknesses corresponding to different materials. For example, a general inorganic dielectric layer has a thickness of 10 nm to 500 nm, and a general organic dielectric layer has a thickness of 1000 nm to 10000 nm. An overly thin dielectric layer may not be formed as a completely dense structure, wherein if so, insulation and capacitance thereof would be difficult to remain. An overly thick dielectric layer may increase working voltage and reduce dielectric susceptibility, such that the contact angle response of the light modulating medium is relative low. The inorganic dielectric layer includes silicon nitride, and typical oxides ($MO_x$) Metal M of the oxides $MO_x$ may be a metal, transitional metal, or semiconductor element and subscript x ranges 1 to 10 and may not be integer. The metal may be Mg, Ca, Sr, or Al. The transitional metal may be Sc, Nb, Gd, Ti, Y, Ta, Hf, Zr, La, Zn, Cu, Ag, or Au. The semiconductor element may be Si. In addition, the dielectric layer may be a single-layered structure or a multi-layered structure of the described oxides or composites thereof. In other embodiments, the organic dielectric layer may be Parylene C, acrylate, epoxy, epoxyamine, siloxane, silicone, silicon oxycarbide, composites thereof, or multi-layered structures thereof. Because the deposited inorganic material has high residual stress and brittleness characteristics, the deposited inorganic material is prone to defects, wherein electrical insulation thereof is poorly influenced. The organic material serving as a strain buffer layer may be collocated with the inorganic material. The organic material, inorganic material, composites thereof, or multi-layered structures thereof preferably have a water/vapor transmission rate of $10^2$ to $10^{-6}$ g/m$^2$.

The dielectric layer may be formed by sputtering, vacuum vapor deposition, chemical vapor deposition (CVD), plasma polymerization, or coating processes. The coating includes spin coating, slit die coating, die coating, dip coating, or jet printing processes. The methods for manufacturing the dielectric layer may be sheet to sheet or roll-to-roll methods.

The dielectric surface may be chemically treated to reduce its surface energy and form an ultra-hydrophobic surface having a lotus effect. The chemical treatment includes direct coating of a hydrophobic material, grafting of fluorinated functional groups on the dielectric surface, chemically bonding the dielectric surface with nanogel of silicon fluoride polymer, chemically bonding the dielectric surface with silicone materials, or selectively mixing together fluorine-containing materials and silicone while evaporating the dielectric layer. The dielectric surface structure may be changed from a planar to a saw-like structure (having a structure size of 10 nm to 100 nm) to reduce its surface energy. Similarly, the dielectric surface may be roughened (having a roughness Ra of 10 nm to 1000 nm) to reduce its surface energy.

The hydrophobic layer has low surface energy for a polar light modulating medium. The hydrophobic layer includes fluorine-containing polymers such as Cytop commercially available from Asahi, Fluoropel commercially available form Cytonix, or Teflon AF commercially available from Dupont, or carbon-containing and hydrophobic polymers. The described hydrophobic layer may have a thickness of 1 nm to 1000 nm, preferably of 5 nm to 150 nm. An overly thin hydrophobic layer may not be formed with sufficient insulation and capacitance. An overly thick hydrophobic layer, e.g. thicker than 1000 nm, has disadvantages of having too small capacitance and too high voltage for driving the entire display device.

For example, the hydrophobic layers have the properties as shown in Table 1:

TABLE 1

|  | DuPont AF 1601 | Asahi CYTOP-809M |
|---|---|---|
| Initial contact angle | ~110° | ~105° |
| Dielectric constant | ~1.93 | ~2.0-2.1 |
| Dielectric Strength (including 50 nm $SiO_2$) | 2.4 V/nm | 2.0 V/nm |
| EW working range | 0~60 V* | 0~20 V* |
|  | 0~95 V** | 0~60 V** |
| MAX. angle difference | 55.11°* | 48.52°* |
|  | 38.75°** | 36.55°** |
| Transmission rate | 92.13%* | 92.49%* |
|  | 91.28%** | 91.20%** |

*50 nm $SiO_2$;
**200 nm $SiO_2$

The hydrophobic layer may be made by sputtering, vacuum vapor deposition, CVD, or coating processes. The coating includes spin coating, slit die coating, die coating, dip coating, or jet printing processes. The methods for manufacturing the dielectric layer may be sheet to sheet or roll-to-roll methods.

The electrode of the electrically switchable light modulating cell may have high conductivity and high transparency, such as metal, conductive metal oxide, or conductive polymer. The metal may be Au, Ag, Cu, Al, or Ni. The conductive metal oxide may be indium tin oxide (ITO), antimony tin oxide (ATO), aluminum-doped zinc oxide (AZO), indium gallium zinc oxide (IGZO), or zinc oxide (ZnO). The conductive polymer may be polyaniline, polypropyrrole, or polythiophene. In other embodiments, the electrode may have a transparency greater than 80%. The electrode may be made by sputtering, vacuum vapor deposition, CVD, or coating processes.

The electrode may be an n-type or p-type doped semiconductor element. If the silicon is doped by P, As, or Sb, the doped silicon may be n-type. If the silicon is doped by B or Al, the doped silicon may be p-type. The n-type and p-type electrodes may be combined to form a diode. When a bias voltage is applied to the electrodes, a threshold voltage may be produced to avoid crosstalk between the electrodes. The semiconductor material doped with high concentrations (e.g. $10^{12}$/cm$^{-3}$ to $10^{21}$/cm$^{-3}$) of n-type or p-type dopants may have such high conductivity as metal.

The partition wall, including, but not limited to, photoresist, may support and separate each of the electrically switchable light modulating cells. The photoresist may be SU-8

Figure 3A:
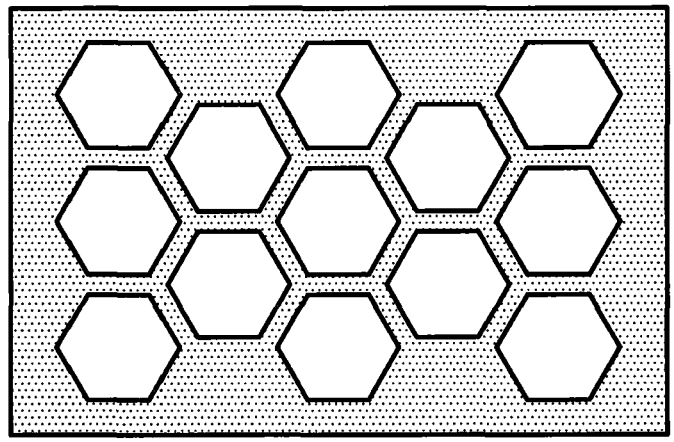
FIGS. 3A-3P show top views of partition wall structures in embodiments of the disclosure.
Figure 3B:
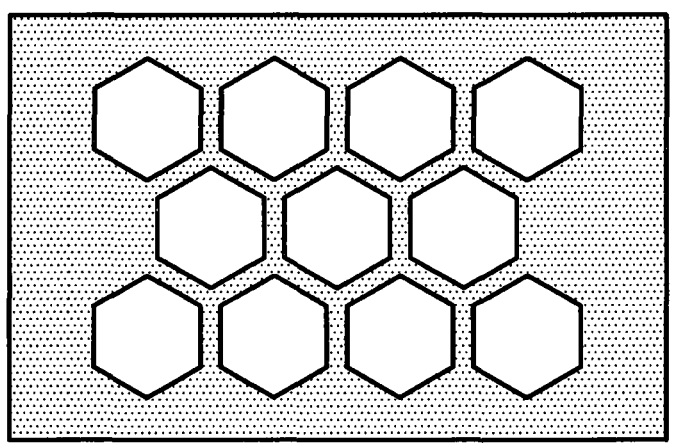
Figure 3C:
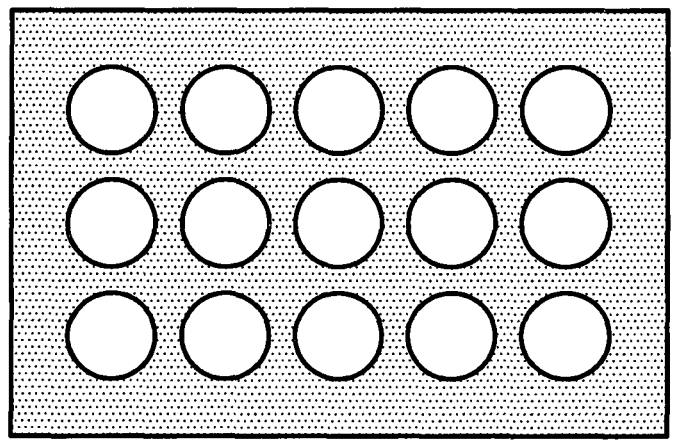
Figure 3D:
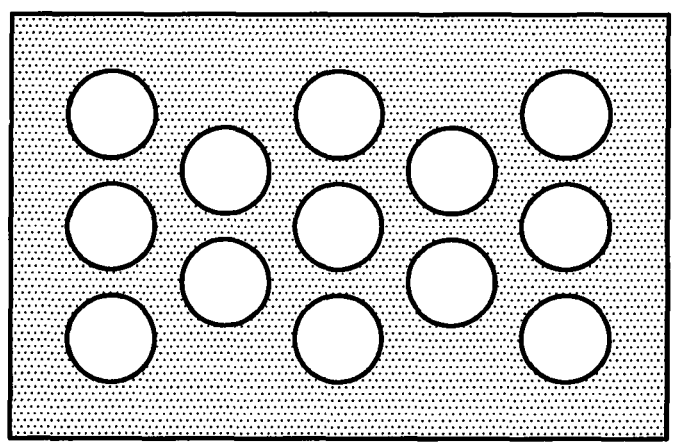
Figure 3E:
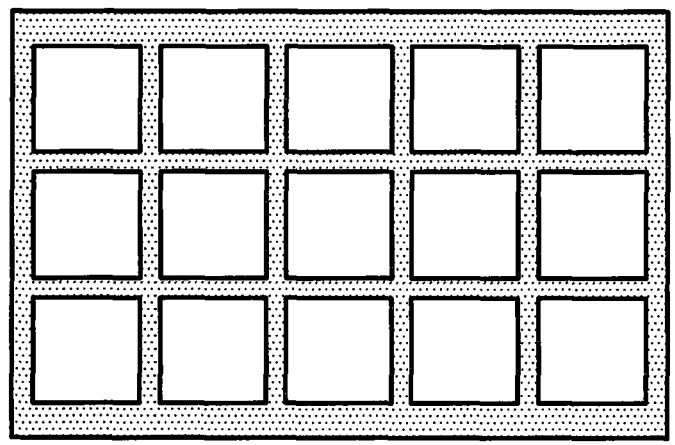
Figure 3F:
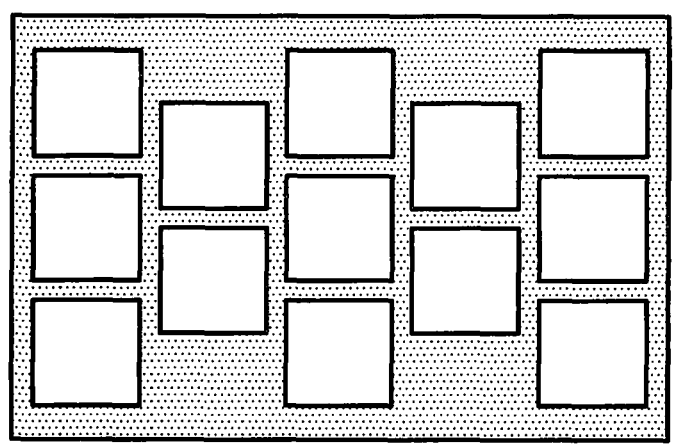
Figure 3G:
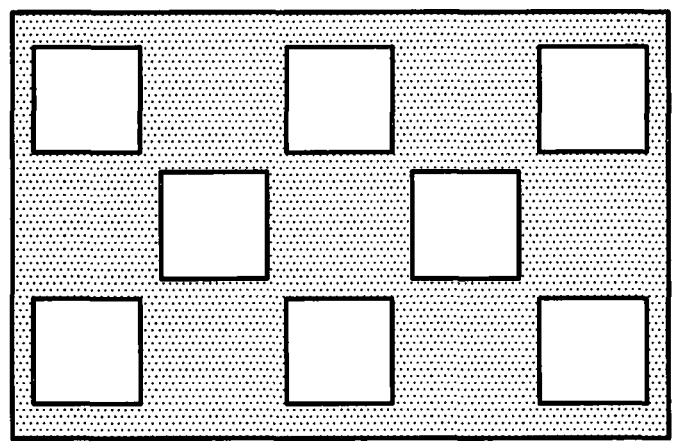
Figure 3H:
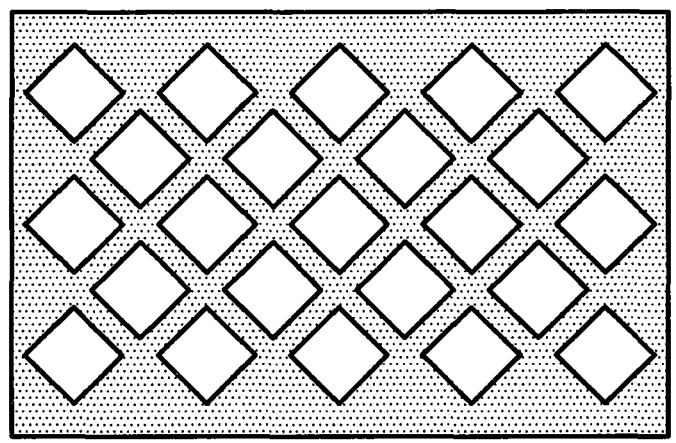
Figure 3I:
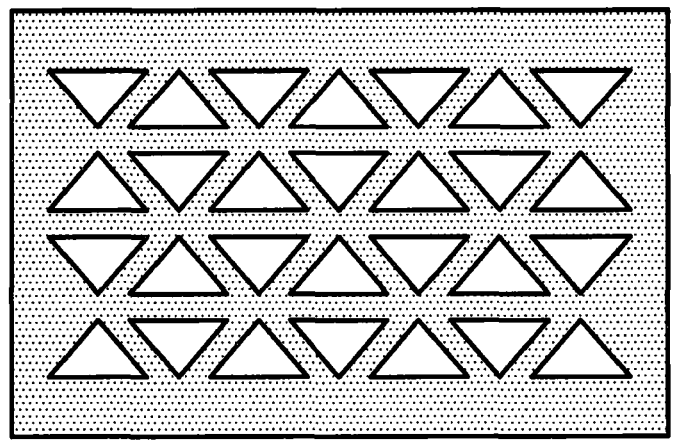
Figure 3J:
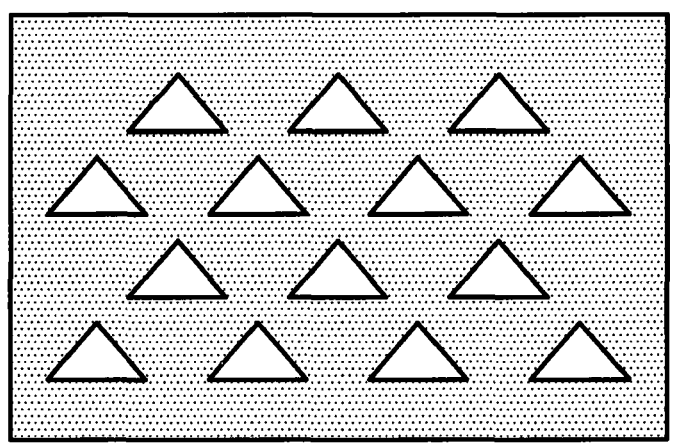
Figure 3K:
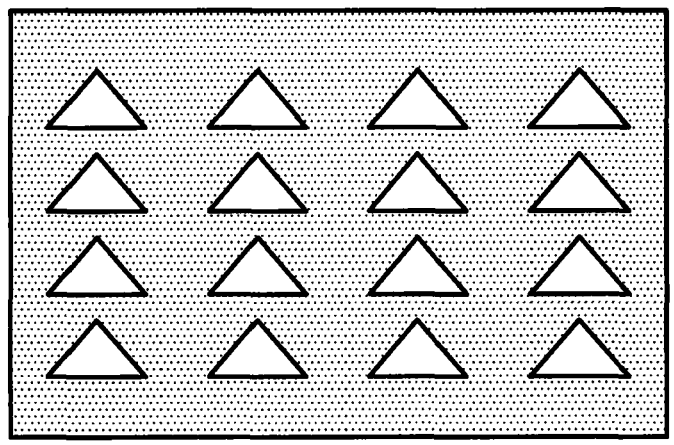
Figure 3L:
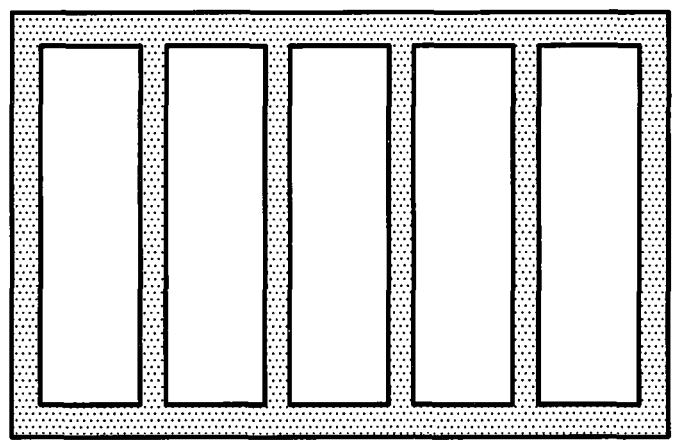
Figure 3M:
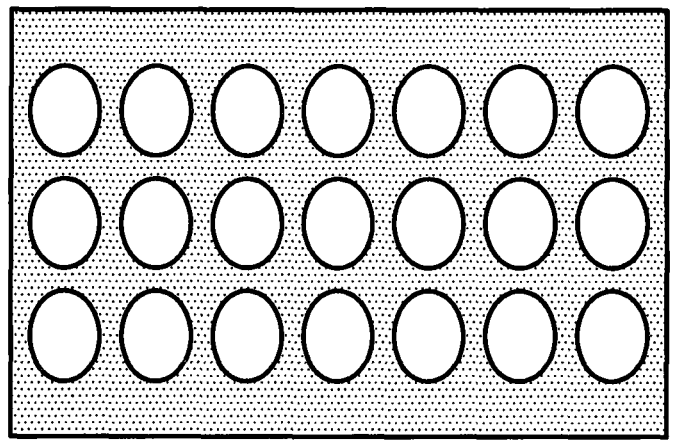
Figure 3N:
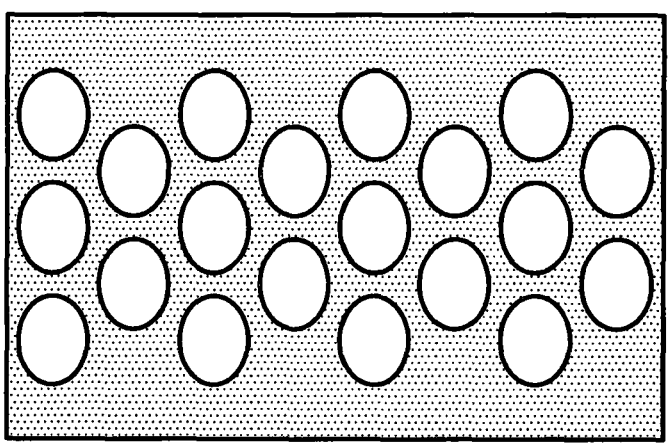
Figure 3O:
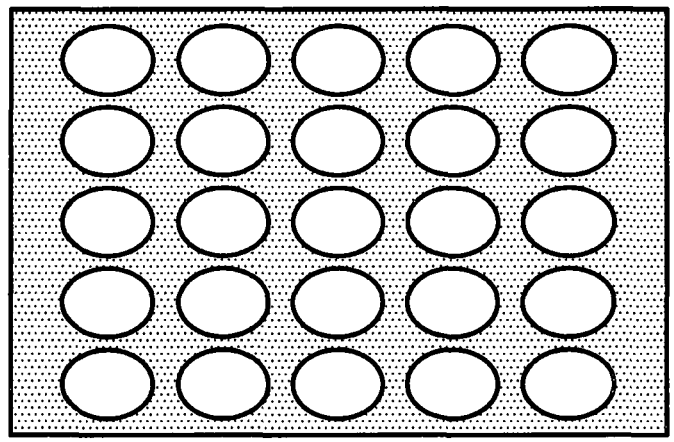
Figure 3P:
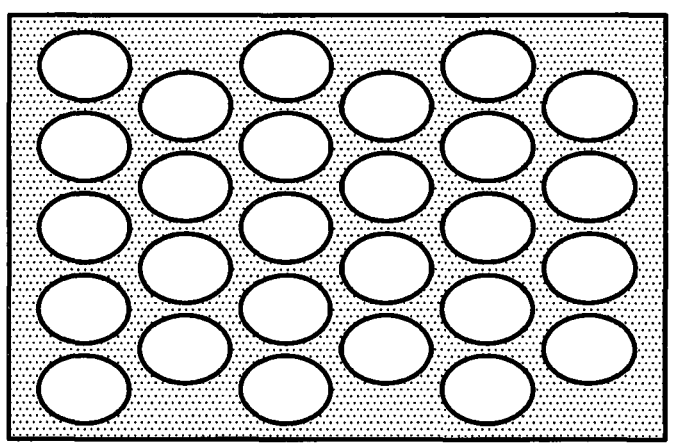

2100 commercially available from MicroChem, JSR-151N commercially available from JSR, KMPR photoresists, or PerMX photoresists. The partition wall may be other material such as poly(methylmethacrylate) (PMMA), poly(dimethylsilicone), dry film, and the likes. In other embodiments, the partition wall may have a height of about 10 μm to 200 μm, and preferably of 50 μm to 150 μm. The partition wall structure must sustain a pressure, of greater than 400 N/mm$^2$, without being deformed when flexed or press is applied. The partition wall structure having a thickness of about 50 μm is formed on a glass substrate, and a pressure of 2000 N/mm$^2$ is applied to the partition wall structure to measure its strength. FIGS. 3A-3O show top views of the partition wall structures in several embodiments of the disclosure. Each enclosed area is one electrically switchable light modulating cell. In other embodiments, the electrically switchable light modulating cells may have cross sections (in top-view) of circular (FIGS. 3C and 3D), cylindrical (FIGS. 3M-3P), triangular (FIGS. 3I-3K), diamond (FIG. 3H), square (FIGS. 3E-3G), rectangular (FIG. 3L), or hexagonal (FIGS. 3A-3B) shapes. The electrically switchable light modulating cells may be arranged in a grid, hive, mesh, or delta like shape, such as a hive-shaped (FIGS. 3A and 3B), and a delta-shaped (FIG. 3J) shape, or an array of triangles (FIGS. 3I-3K), an array of rectangles (FIG. 3L), an array of ovals (FIGS. 3M-3P), an array of circles (FIGS. 3C-3D), an array of squares (FIGS. 3E-3G), an array of diamonds (FIG. 3H), or an array of trenches (FIG. 3H). The partition wall may be made by forming a photoresist layer, exposing the photoresist layer, and then developing the photoresist layer. The partition wall may be formed by other methods such as imprinting, embossing, and mesh printing methods, and the likes. The methods for manufacturing the partition wall may be sheet to sheet or roll-to-roll methods.

light modulating mediums to be homed due to their inherent surface tensions. In the electrically switchable light modulating cell of the disclosure, the specific partition wall structure may efficiently reduce or eliminate misplacement of the polar and non-polar light modulating mediums. When the polar and non-polar light modulating mediums having similar densities are injected into the electrically switchable light modulating cell, interior surface of the specific geometrical shape of the partition wall structure benefits by having a capillary force produced therebetween. As such, the polar and non-polar light modulating mediums may separate from each other without being misplaced. As described above, the misplacement is the arrangement of the light modulating mediums being reversed. The light modulating mediums have better homing due to the described capillary force.

According to the disclosure, the partition wall structure shape, size, and/or ratio, and the type of the polar light modulating medium may be changed to reduce or eliminate the misplacement phenomenon, as well as to increase the homing ability of the light modulating medium after the applied voltage is turned off.

As shown in Table 2, the square (in top-view cross-section) cell has a longer height causing a higher capillary force (and higher driving voltage) between the partition wall and the polar light modulating medium. In other words, the cell having a shorter height causes lower capillary force (and lower driving voltage) between the partition wall and the polar light modulating medium.

TABLE 2

|  |  | 1 mm (width) | 2 mm (width) | 3 mm (width) | 4 mm (width) | 5 mm (width) | 6 mm (width) | 7 mm (width) |
| --- | --- | --- | --- | --- | --- | --- | --- | --- |
| Square cell | 6 mm (height) | 4 V | 3 V | 1.7 V | 1.6 V | 0.9 V | 0.35 V | 0.25 V |
| Square cell | 3 mm (height) | 2 V | 0.5 V | 0.3 V | 0.2 V | 0.17 V | 0.13 V | 0.1 V |

Note:
the filling ratio of the oil/aqueous solution is 1:1, wherein the oil is silicon oil (Acros 17466), and the aqueous solution is 0.1 wt % KCl aqueous solution.

Table 3 shows the driving voltages corresponding to the cell aspect ratios of different cross-sectional shaped in side-view.

TABLE 3

|  |  | 1 mm (width) | 2 mm (width) | 3 mm (width) | 4 mm (width) | 5 mm (width) | 6 mm (width) | 7 mm (width) |
| --- | --- | --- | --- | --- | --- | --- | --- | --- |
| Square cell | 6 mm (height) | 4 V | 3 V | 1.7 V | 1.6 V | 0.9 V | 0.35 V | 0.25 V |
| Cylindrical cell | 6 mm (height) | 4 V | 3 V | 1.8 V | 1.7 V | 1.6 | 0.8 V | 0.5 V |
| Reverse trapezoid cell | 6 mm (height) | 3 V | 2 V | 1.3 V | 1 V | 0.6 | 0.3 V | 0.25 V |

Note:
the filling ratio of the oil/aqueous solution is 1:1, wherein the oil is silicon oil (Acros 17466), and the aqueous solution is 0.1 wt % KCl aqueous solution.

Based on the electrowetting concept, the polar light modulating medium in the electrically switchable light modulating cell may deform when a voltage is applied thereto. Generally, the polar and non-polar light modulating mediums are easily misplaced due to overly low adhesive force between the space surface and the light modulating mediums. After the applied voltage is turned off, it is difficult for the polar and non-polar Because the polar light modulating medium easily forms balls, the ball-like polar light modulating medium has a larger contact area with the curved surface of the cylindrical cell than the planar surface of the square cell. As such, the capillary force (and driving voltage) between the polar light modulating medium and the partition wall in the cylindrical cell is higher as compared to that in the square cell, as shown in Table 3. Because the reverse trapezoid cell has a bigger top opening and a smaller bottom opening, the ball-like polar light modulating medium has difficultly being adhered onto the partition wall surface. As such, the polar light modulating medium and the partition wall in the reverse trapezoid cell have minimal capillary force (and driving voltage), when compared to the square cell and the cylindrical cell.

Table 4 shows the deformation degrees of the polar light modulating medium (applied same voltage) in the electrically switchable light modulating cells with different aspect ratios and cross-sectional shapes. When the partition wall height is shorter, the capillary force between the space surface and the polar light modulating medium becomes weaker. The voltage applied to the polar light modulating medium may deform the polar light modulating medium. An overly high voltage may easily deform the polar light modulating medium too much.

TABLE 4

|  |  | 1 mm (width) | 2 mm (width) | 3 mm (width) | 4 mm (width) | 5 mm (width) | 6 mm (width) | 7 mm (width) |
|---|---|---|---|---|---|---|---|---|
| Square cell | 6 mm (height) | No deformation | No deformation | No deformation | No deformation | Appropriate deformation | Over deformation | Over deformation |
| Square cell | 3 mm (height) | Appropriate deformation | Over deformation | Over deformation | Over deformation | Over deformation | Over deformation | Over deformation |

Note:
the filling ratio of the oil/aqueous solution is 1:1, wherein the oil is silicon oil (Acros 17466), and the aqueous solution is 0.1 wt % KCl aqueous solution.

Table 5 shows the deformation degrees of the polar light modulating medium (applied same voltage) in the electrically switchable light modulating cells with different aspect ratios and cross-sectional shapes. The polar light modulating medium content in Table 4 is different from that in Table 5.

TABLE 5

|  |  | 1 mm (width) | 2 mm (width) | 3 mm (width) | 4 mm (width) | 5 mm (width) | 6 mm (width) | 7 mm (width) |
|---|---|---|---|---|---|---|---|---|
| Square cell | 6 mm (height) | No deformation | No deformation | No deformation | No deformation | Appropriate deformation | Over deformation | Over deformation |
| Cylindrical Cell | 6 mm (height) | No deformation | No deformation | No deformation | No deformation | No deformation | Over deformation | Over deformation |
| Reverse trapezoid cell | 6 mm (height) | No deformation | No deformation | No deformation | Appropriate deformation | Over deformation | Over deformation | Over deformation |

Note:
the filling ratio of the oil/aqueous solution is 1:1, wherein the oil is silicon oil (Acros 17466), and the aqueous solution is a mixture of water (80 wt %), glycerin (20 wt %), and KCl (0.1 wt %).

Table 6 shows the driving voltages corresponding to different polar light modulating mediums. When the water is further mixed with glycerin, the cohesive force (intramolecular interaction) of the polar light modulating medium is reduced, thereby reducing the capillary force between the partition wall surface and the polar light modulating medium.

TABLE 6

|  |  |  | Width | | | | | | |
|---|---|---|---|---|---|---|---|---|---|
|  | Voltage |  | 1 mm | 2 mm | 3 mm | 4 mm | 5 mm | 6 mm | 7 mm |
| Square cell | 0.1 wt % KCl aqueous solution |  | 4 V | 3 V | 1.7 V | 1.6 V | 0.9 V | 0.35 V | 0.25 V |
| Square cell | Mixture of water (80 wt %), glycerin (20 wt %), and KCl (0.1 wt %) |  | 2 V | 2 V | 1.5 V | 1 V | 0.4 V | 0.3 V | 0.2 V |

Note:
the filling ratio of the oil/aqueous solution is 1:1, wherein the oil is silicon oil (Acros 17466), and the aqueous solution (polar light modulating medium) is shown in Table 6.

FIGS. 4A-4H show a method for manufacturing a three-dimensional image display device of one embodiment of the disclosure.

Figure 4A:
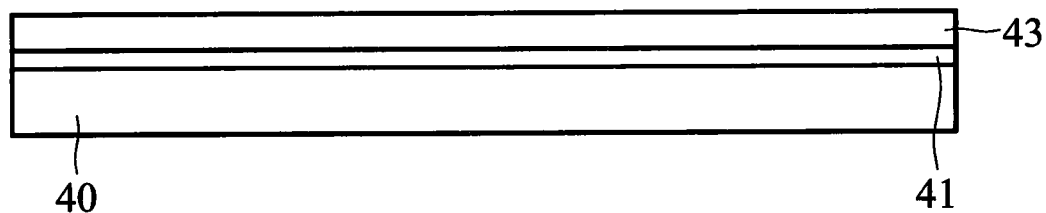
FIGS. 4A-4H show a method for manufacturing a three-dimensional image display device in one embodiment of the disclosure.

As shown in FIG. 4A, an ITO film 41 on a glass substrate 40 is put in acetone and under supersonic vibration for 5 minutes, put in isopropyl alcohol and under supersonic vibration for 5 minutes, and then put in de-ionized water and under supersonic vibration for 5 minutes. The substrate is then blow-dried by nitrogen, and then pre-baked at 120° C. for 20 minutes. A photoresist layer 43 is spin-coated onto the ITO film 41, and then baked by a hot plate at 100° C. for 2 minutes to 10 minutes.

Figure 4B:
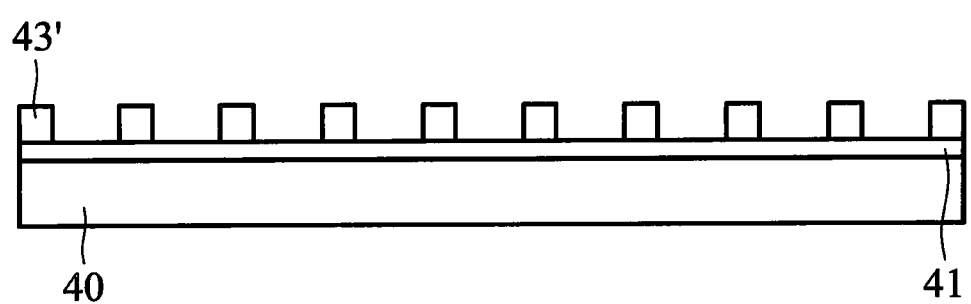

As shown in FIG. 4B, the photoresist layer 43 is exposed by a photomask (EVG620, 21 mW/cm$^2$) for 35 seconds, and then developed by 2.38 wt % of trimethylammonium hydroxide (TMAH) for 120 seconds to form the photoresist pattern 43'. The photoresist pattern 43' is washed by de-ionized water for 5 minutes, and then blow-dried by nitrogen.

Figure 4C:
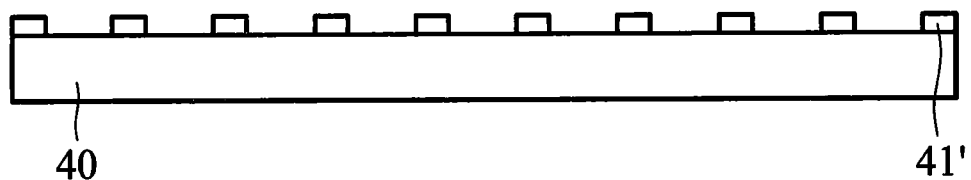

As shown in FIG. 4C, the ITO film 41 is etched by wet etching (eSolv EG-418) at 55° C. for 60 seconds to form ITO pattern 41'. Afterward, the photoresist pattern 43' is removed. The ITO pattern 41' is blow-dried by nitrogen, and analyzed by a microscope to check for defects.

Figure 4D:
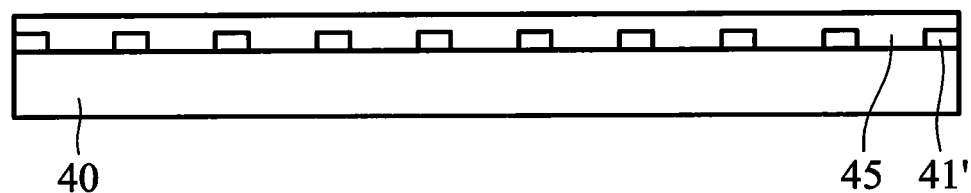

As shown in FIG. 4D, the glass substrate 40 and the ITO pattern 41' thereon is put in acetone and under supersonic vibration for 5 minutes, put in isopropyl alcohol to and under supersonic vibration for 5 minutes, put in de-ionized water to supersonic for 5 minutes, and then blow-dried by nitrogen. Thereafter, a dielectric layer 45 such as $SiO_2$ or $Al_2O_3$ of 5 nm to 1000 nm is deposited on the glass substrate 40 and the ITO pattern 41' by PECVD at 350° C.

Figure 4E:
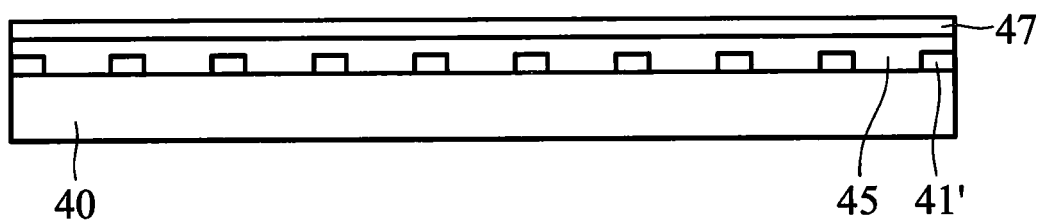

As shown in FIG. 4E, a hydrophobic layer 47 is spin-coated onto the dielectric layer 45. The hydrophobic layer 47 may be Teflon AF 1601 commercially available from Dupont or CYTOP-809M commercially available from Asahi. The hydrophobic layer 47 has a thickness of 5 nm to 1000 nm. The hydrophobic layer 47 of Teflon AF 1601 may be put on a hot plate to bake at 200° C. for 20 minutes, and the hydrophobic layer 47 of CYTOP-809M may be put on a hot plate to bake at 180° C. for 60 minutes.

Figure 4F:
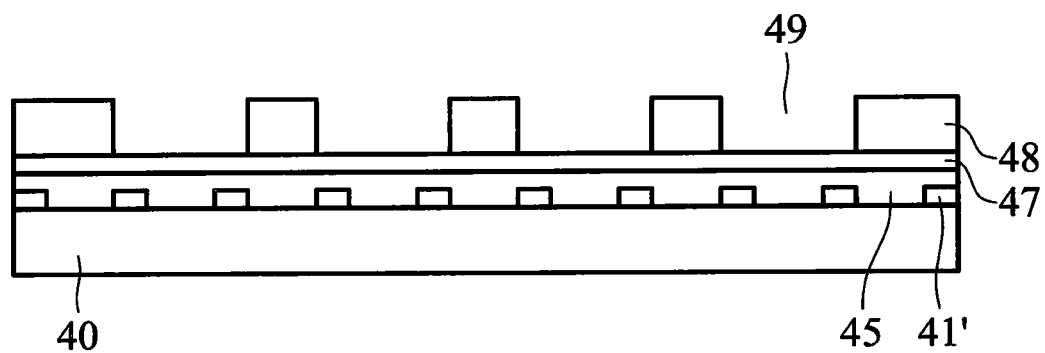

As shown in FIG. 4F, a partition wall material is spin-coated onto the hydrophobic layer 47 to form a partition layer of 10 μm to 500 μm. The partition layer is exposed by a suitable photomask and then developed to define partition walls 48 and compartments 49. Alternatively, the partition layer is imprinted to define the partition walls 48 and the compartments 49. Thereafter, the partition walls 48 and the compartments 49 are blow-dried by nitrogen, and put on a hot plate to bake at 95° C. for 15 minutes (when the partition walls 48 are SU-8 2100) or to bake at 115° C. for 30 minutes (when the partition walls 48 are JSR-151N).

Figure 4G:
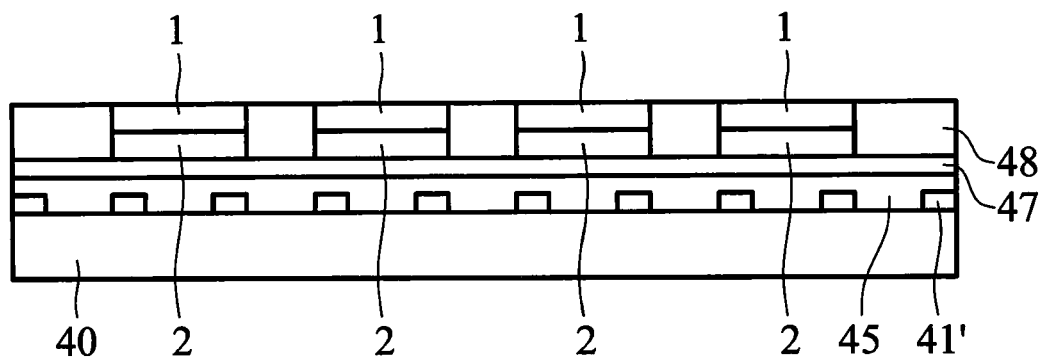

As shown in FIG. 4G, a polar light modulating medium 1 and a non-polar modulating medium 2 are injected into the compartments 49 by a fluid injector (Dimatix DMP-2800 commercially available from Fujitsu). The non-polar light modulating medium 2 may have a viscosity of less than 50 cP (centriPoises). Alternatively, non-polar light modulating medium 2 may be air, such that the combination of the light modulating mediums may be polar light modulating medium 1 (e.g. water) and air.

Figure 4H:
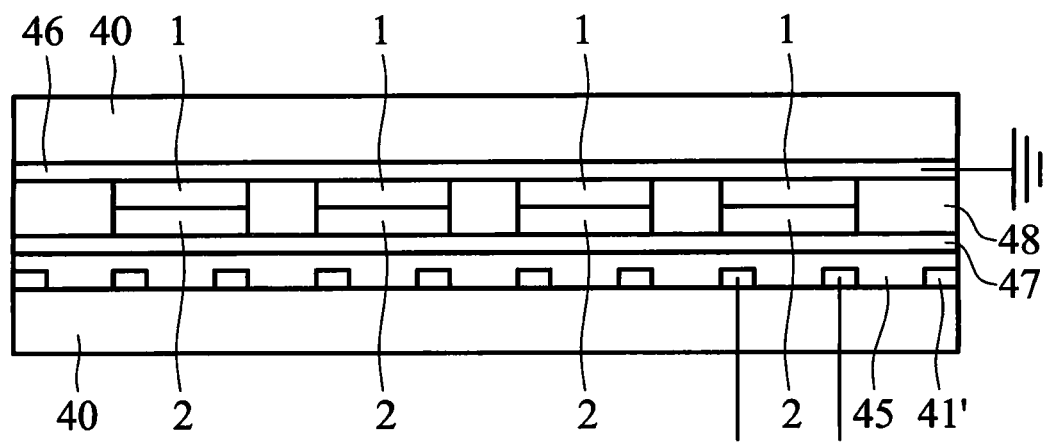

As shown in FIG. 4H, an adhesive layer 46 is applied to bond the structure in FIG. 4G to another glass substrate 40. The adhesive layer 46 may be epoxy adhesive agent (LET-BOND) cured by UV curing or thermal curing. The misalignment of this bonding process may be less than 10 μm.

The ITO pattern 41' may be formed by other methods such as screen printing or inject printing methods. Alternatively, the ITO pattern 41' may be replaced by other conductive materials such as a 5 nm to 5000 nm film of silver gel, copper gel, or carbon gel. The screen printing method utilizes the screen to define the pattern, and the inject printing method utilizes the inject path to define the pattern.

When a voltage is applied to the electrodes (ITO pattern 41') of the electrically switchable light modulating cells, the interface profile between the polar light modulating medium 1 and the non-polar light modulating medium 2 may non-horizontally deform, such that a light traveling from the bottom glass substrate 40 to the top glass substrate 40 may be deflected to a right eye or a left eye of a viewer. As such, the viewer may see three-dimensional images.

FIGS. 5A-5G show a method for manufacturing a three-dimensional image display device of one embodiment of the disclosure.

Figure 5A:
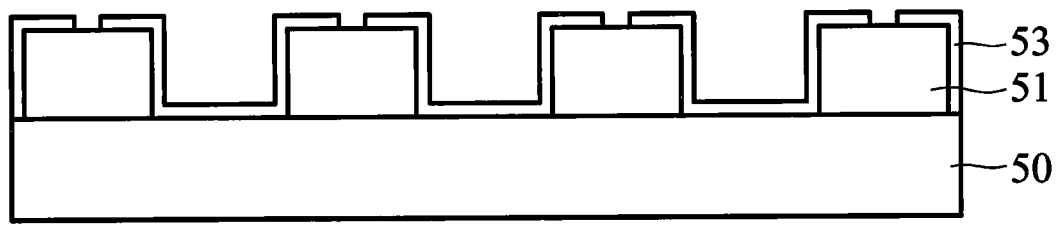
FIGS. 5A-5G show a method for manufacturing a three-dimensional image display device in one embodiment of the disclosure.

As shown in FIG. 5A, a partition layer having a thickness of 10 μm to 500 μm is formed on a first carrier 50 by spin-coating or die coating, and then put on a hot plate to soft-bake at 100° C. for 5 minutes. The partition layer is imprinted (or exposed by a suitable photomask and then developed) to define partition walls 51, washed by de-ionized water, blow-dried by nitrogen, and put on a hot plate to bake at 95° C. for 15 minutes (when the partition walls 51 are SU-8 2100) or to bake at 115° C. for 30 minutes (when the partition walls 51 are JSR-151N). Thereafter, a conductive layer is conformally deposited on the first carrier 50 and the partition walls 51 by physical vapor deposition (PVD). The conductive layer may have a thickness of 5 nm to 5000 nm. The conductive layer may be copper, ITO, AZO, or IGZO. The conductive layer is then patterned by lithography or the likes to form electrodes 53.

Figure 5B:
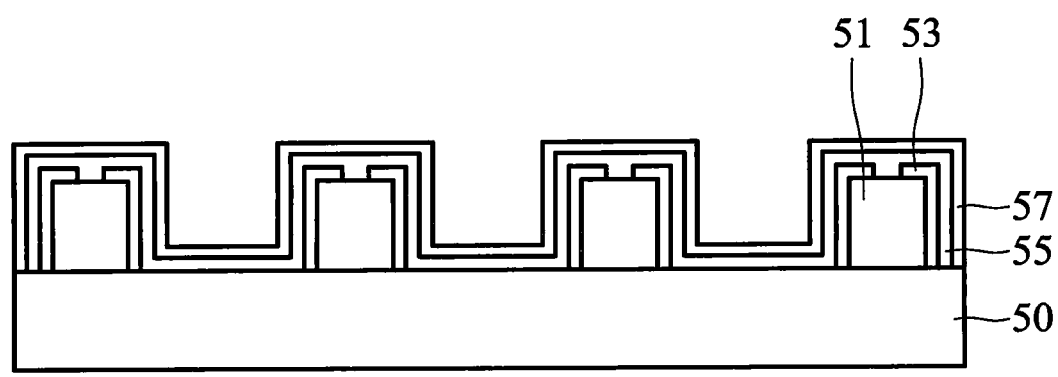

As shown in FIG. 5B, a dielectric layer 55 such as 5 nm to 9000 nm of Parylene C or 5 nm to 1000 nm of $SiO_2$ or $Al_2O_3$ is deposited by PVD on the structure of FIG. 5A. Thereafter, a hydrophobic layer 57 is spin-coated or dip coated on the dielectric layer 55. The hydrophobic layer 57 may be Teflon AF 1601 commercially available from Dupont or CYTOP-809M commercially available from Asahi. The hydrophobic layer 57 has a thickness of 5 nm to 1000 nm. The hydrophobic layer 57 of Teflon AF 1601 may be put on a hot plate to bake at 200° C. for 5 minutes to 30 minutes, and the hydrophobic layer 57 of CYTOP-809M may be put on a hot plate to bake at 180° C. for 60 minutes.

Figure 5C:
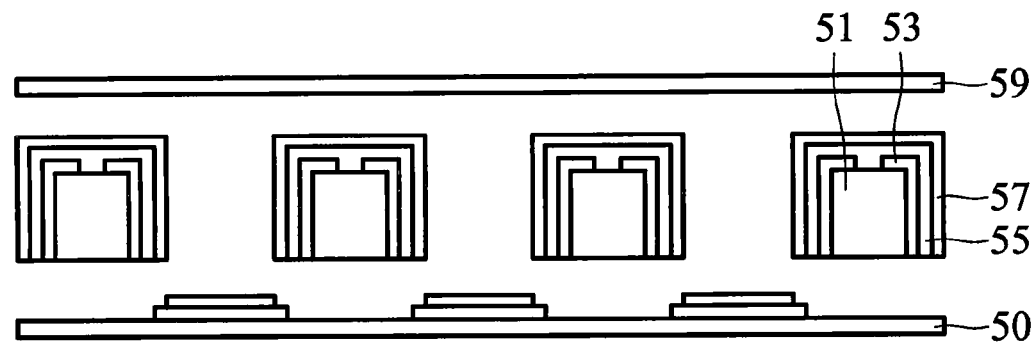

As shown in FIG. 5C, the structure of FIG. 5B is transfer printed to a second carrier 59 to perform following processes.

Figure 5D:
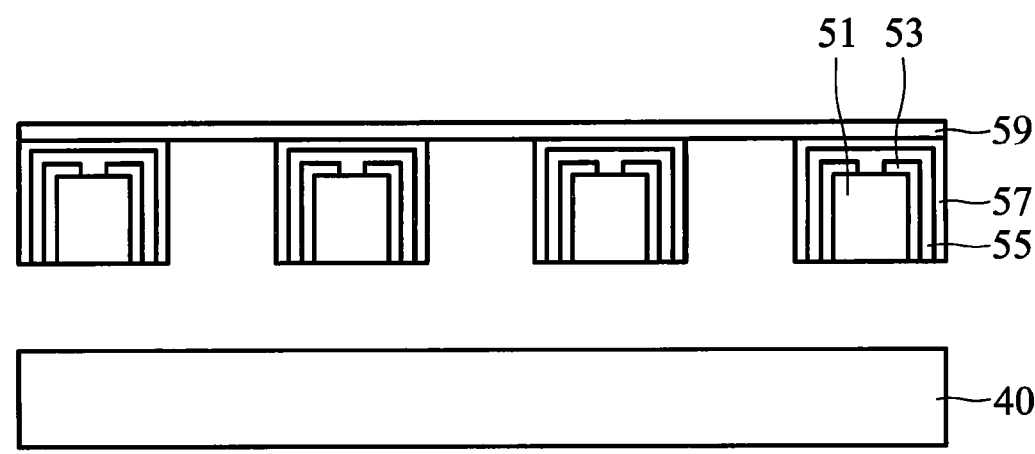

As shown in FIG. 5D, an adhesive layer (not shown) is applied to bond the structure in FIG. 5C to a glass substrate 40. The misalignment of this bonding process must be less than 10 μm. The second carrier 59 is removed after the bonding process.

Figure 5E:
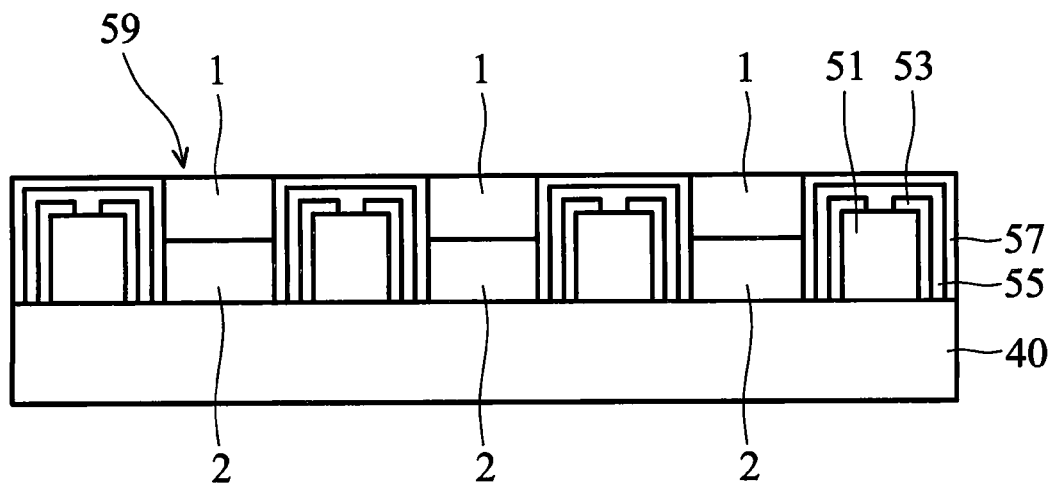

As shown in FIG. 5E, a polar light modulating medium 1 and a non-polar modulating medium 2 are injected into the compartments 59 by a fluid injector (Dimatix DMP-2800 commercially available from Fujitsu). The non-polar light modulating medium 2 may have a viscosity of less than 50 cP (centriPoises). Alternatively, non-polar light modulating medium 2 may be air, such that the combination of the light modulating mediums may be polar light modulating medium 1 (e.g. water) and air.

Figure 5F:
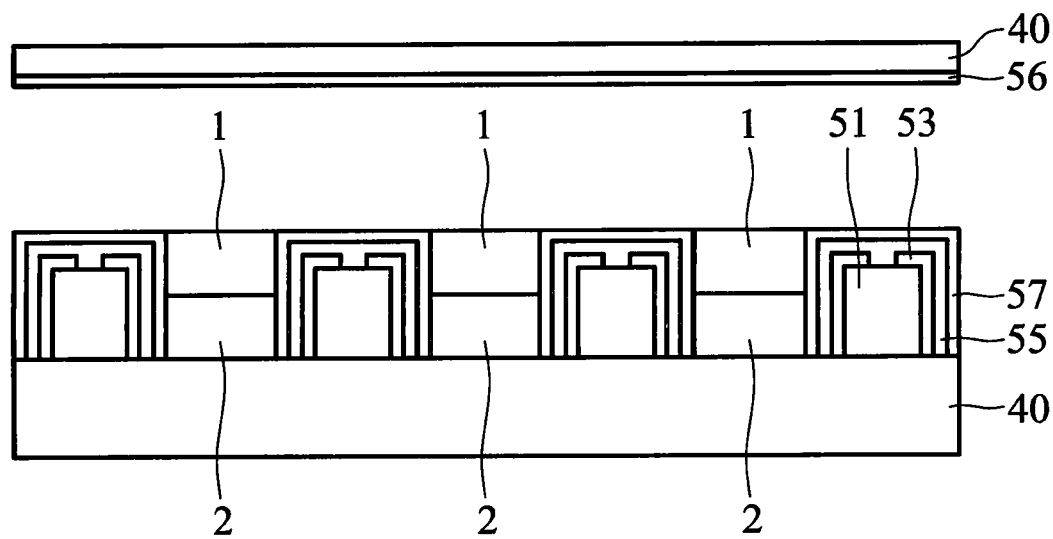
Figure 5G:
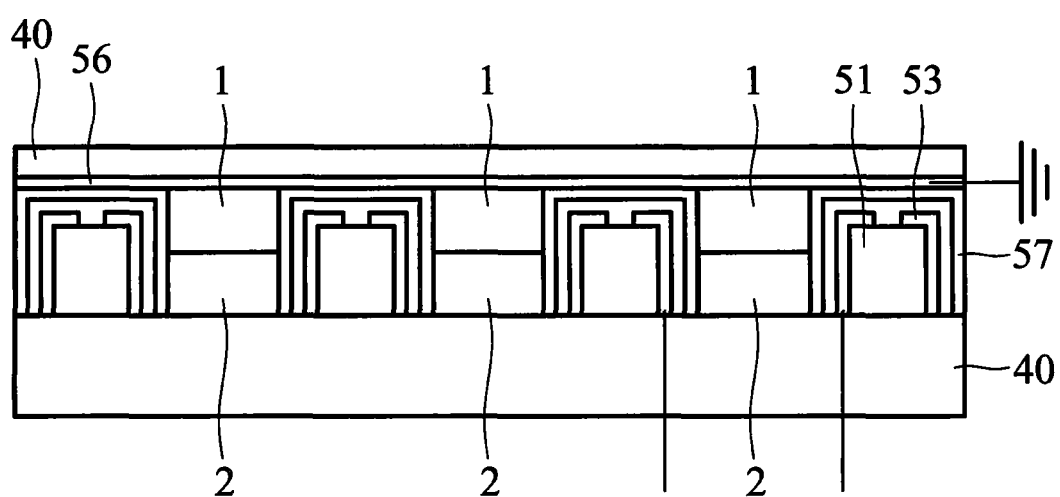

As shown in FIG. 5F, an adhesive layer 56 is applied to bond the structure of FIG. 5E to another glass substrate 40. The misalignment of this bonding process may be less than 10 μm. As a result, a three-dimensional image display device is completed, as shown in FIG. 5G.

The electrodes 53 may be formed by other methods such as screen printing or inject printing methods. For example, the electrodes 53 may be a 5 nm to 5000 nm film of silver gel, copper gel, or carbon gel.

When a voltage is applied to the electrodes 53 of the electrically switchable light modulating cells, the interface profile between the polar light modulating medium 1 and the non-polar light modulating medium 2 may non-horizontally deform, such that a light traveling from the bottom glass substrate 40 to the top glass substrate 40 may be deflected to a right eye or a left eye of a viewer. As such, the viewer may see three-dimensional images.

FIGS. 6A-6E show a method for manufacturing a three-dimensional image display device in one embodiment of the disclosure.

Figure 6A:
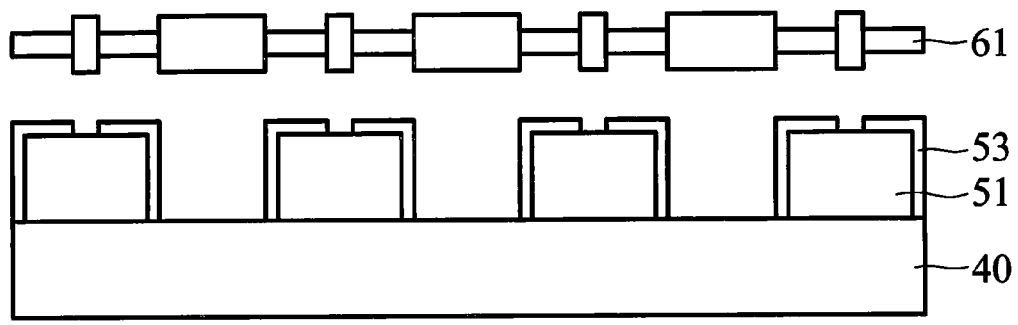
FIGS. 6A-6E show a method for manufacturing a three-dimensional image display device in one embodiment of the disclosure.

As shown in FIG. 6A, a partition layer having a thickness of 10 μm to 500 μm is formed on a glass substrate 40 by spin-coating or die coating, and then put on a hot plate to soft-bake at 100° C. for 5 minutes. The partition layer is imprinted (or exposed by a suitable photomask and then developed) to define partition walls 51, washed by de-ionized water, blow-dried by nitrogen, and put on a hot plate to bake at 95° C. for 15 minutes (when the partition walls 51 are SU-8 2100) or to bake at 115° C. for 30 minutes (when the partition walls 51 are JSR-151N). Thereafter, electrodes 53 are deposited on the glass substrate 40 and the partition walls 51 by physical vapor deposition (PVD) and a shadow mask 61. The electrodes 53 may have a thickness of 5 nm to 5000 nm. The electrodes 53 may be copper, ITO, AZO, or IGZO.

Figure 6B:
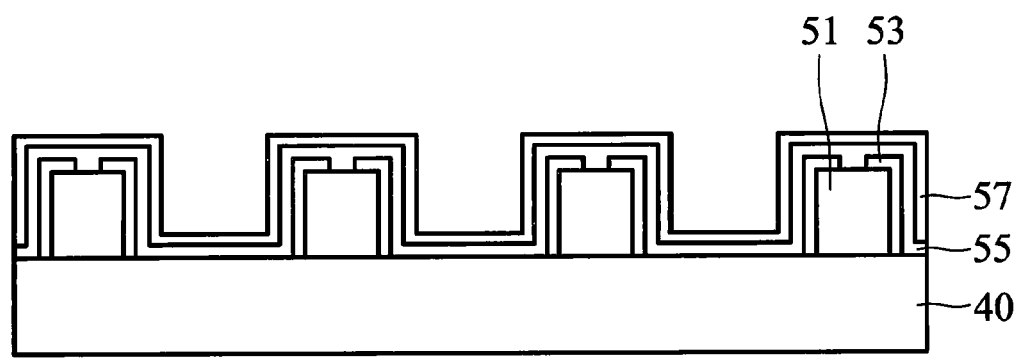

As shown in FIG. 6B, a dielectric layer 55 such as 5 nm to 9000 nm of Parylene C or 5 nm to 1000 nm of $SiO_2$ or $Al_2O_3$ is deposited by PVD on the structure of FIG. 6A. Thereafter, a hydrophobic layer 57 is spin-coated or dip coated on the dielectric layer 55. The hydrophobic layer 57 may be Teflon AF 1601 commercially available from Dupont or CYTOP-809M commercially available from Asahi. The hydrophobic layer 57 has a thickness of 5 nm to 1000 nm. The hydrophobic layer 57 of Teflon AF 1601 may be put on a hot plate to bake at 200° C. for 5 minutes to 30 minutes, and the hydrophobic layer 57 of CYTOP-809M may be put on a hot plate to bake at 180° C. for 60 minutes.

Figure 6C:
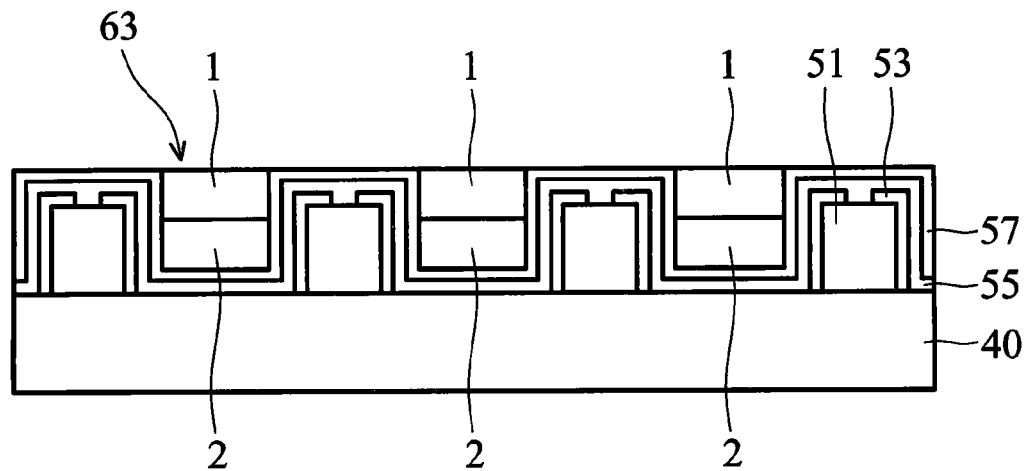

As shown in FIG. 6C, a polar light modulating medium 1 and a non-polar modulating medium 2 are injected into the compartments 63 by a fluid injector (Dimatix DMP-2800 commercially available from Fujitsu). The non-polar light modulating medium 2 may have a viscosity of less than 50 cP (centriPoises). Alternatively, non-polar light modulating medium 2 may be air, such that the combination of the light modulating mediums may be polar light modulating medium 1 (e.g. water) and air.

Figure 6D:
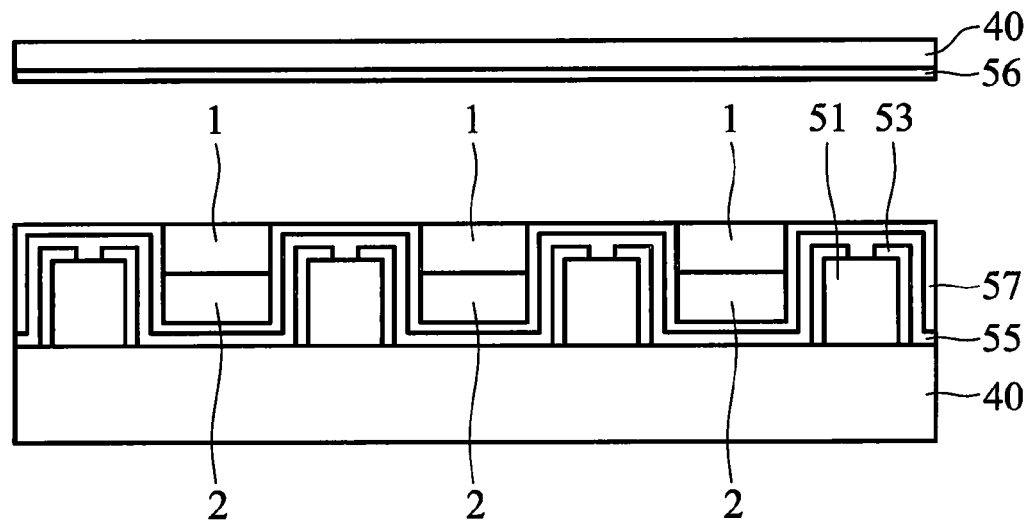
Figure 6E:
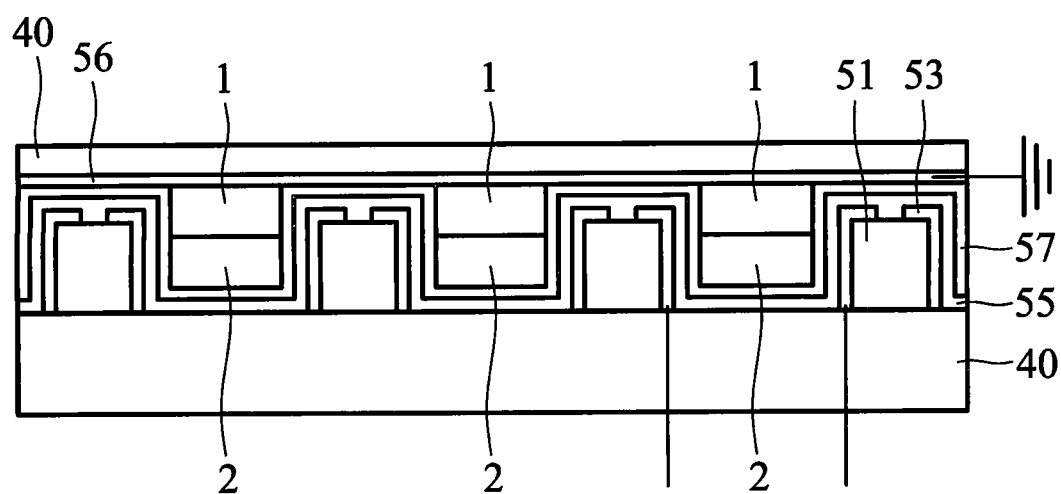

As shown in FIG. 6D, an adhesive layer 56 is applied to bond the structure of FIG. 6C to another glass substrate 40. The misalignment of this bonding process may be less than 10 μm. As a result, a three-dimensional image display device is completed, as shown in FIG. 6E.

The electrodes 53 may be formed by other methods such as screen printing or inject printing methods. For example, the electrodes 53 may be a 5 nm to 5000 nm film of silver gel, copper gel, or carbon gel.

When a voltage is applied to the electrodes 53 of the electrically switchable light modulating cells, the interface profile between the polar light modulating medium 1 and the non-polar light modulating medium 2 may non-horizontally deform, such that a light travelling from the bottom glass substrate 40 to the top glass substrate 40 may be deflected to a right eye or a left eye of a viewer. As such, the viewer may see three-dimensional images.

Figure 7A:
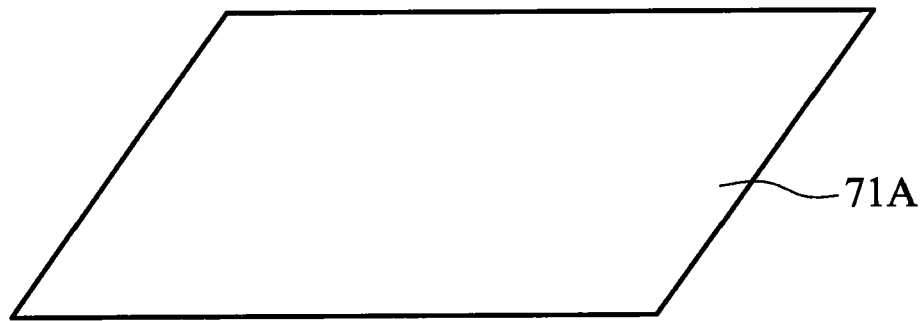
FIGS. 7A-7E show a method for defining partition walls in one embodiment of the disclosure.
Figure 7B:
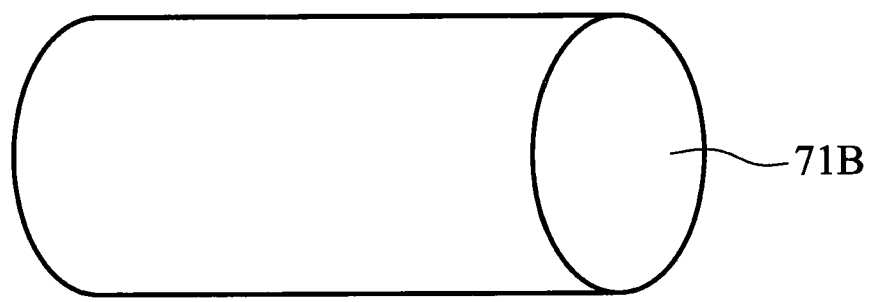
Figure 7C:
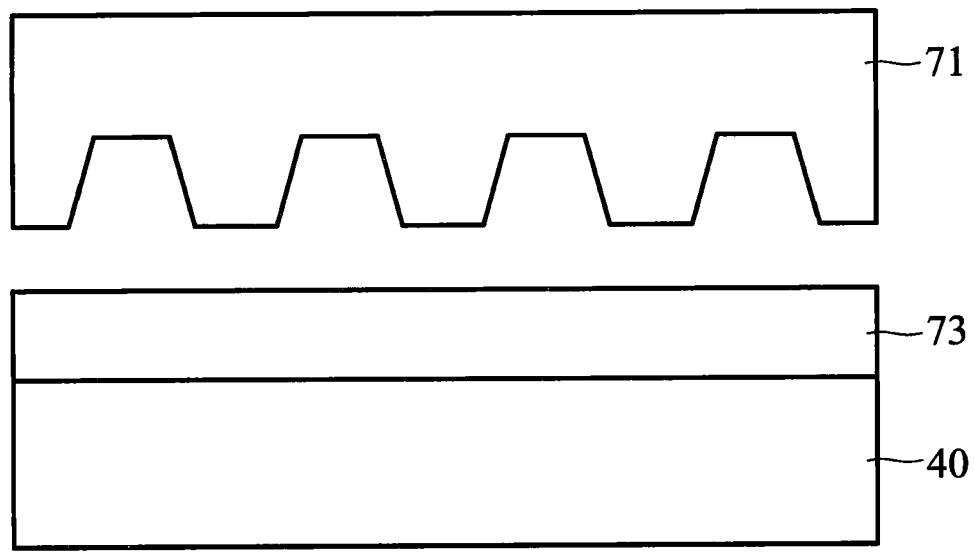

FIGS. 7A-7E show a method for defining partition walls in one embodiment of the disclosure. A sheet-like mold 71A as shown in FIG. 7A or a cylinder-like mold 71B serves as an imprint mold 71 in FIG. 7C. The imprint mold 71 may be processable material such as copper, aluminum, silicon wafer, or the likes. A partition wall material layer 73 is spin-coated on a glass substrate 40. The glass substrate 40 has a thickness of 0.7 mm, and the partition wall material layer 73 has a thickness of 10 μm to 500 μm, respectively.

Figure 7D:
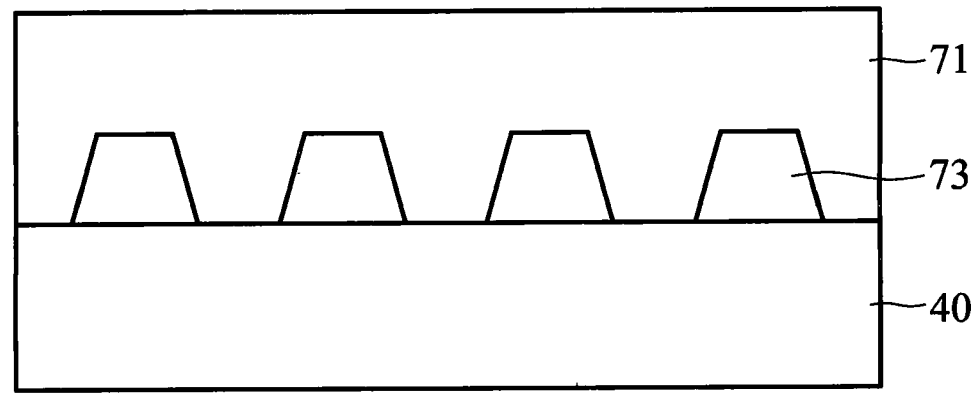

As shown in FIG. 7D, the imprint mold 71 is applied an average pressure to be pressed on the partition wall material layer 73. Meanwhile, the imprinted partition wall material layer 73 is thermally cured or UV cured to form partition walls 73'. When UV curing is adopted, the UV light transmits through the glass substrate 40.

Figure 7E:
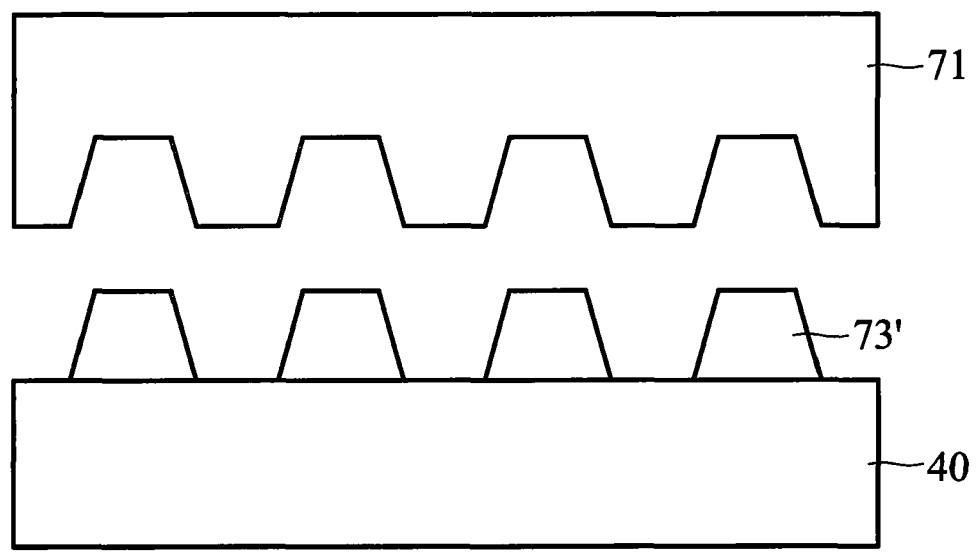

As shown in FIG. 7E, the partition walls 73' is formed on the glass substrate 40, and the imprint mold 71 is de-molded. The partition walls 73' may have an optimum profile without other partition wall material residue by controlling speed, temperature, angle, and/or other factors of the de-molding process.

FIGS. 8A-8E show a method for defining partition walls in one embodiment of the disclosure.

Figure 8A:
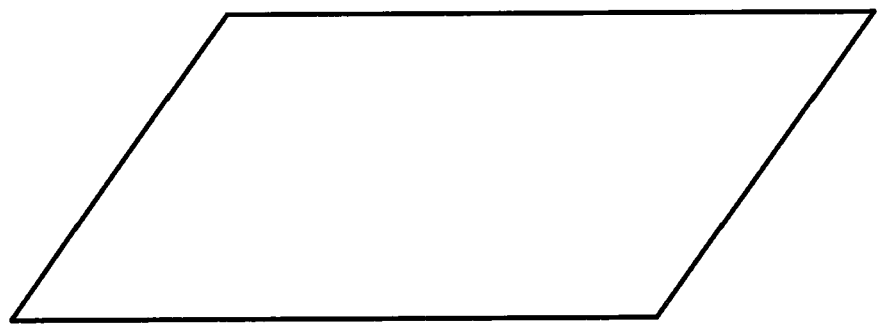
FIGS. 8A-8E show a method for defining partition walls in one embodiment of the disclosure.
Figure 8B:
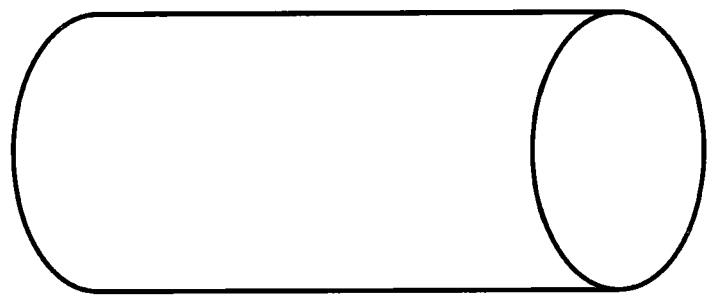
Figure 8C:
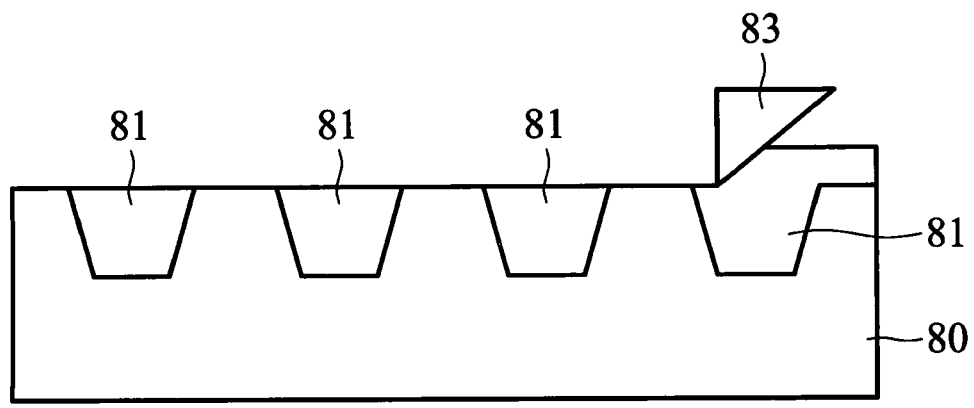

As shown in FIG. 8C, a partition wall material 81 is filled in cavities of a mold 80 by a scraper 83. The mold 80 may be sheet-like as shown in FIG. 8A or cylinder-like as shown in FIG. 8B. The mold 80 may be processable material such as copper, aluminum, silicon wafer, or the likes.

Figure 8D:
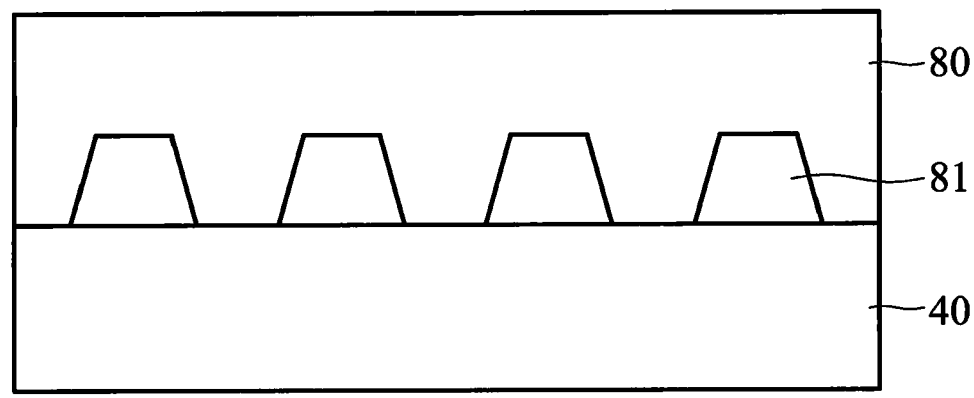

As shown in FIG. 8D, the mold 80 with the partition wall material 81 filled in its cavities is flip pressed on a glass substrate 40. The flip pressing process is performed with average pressure. The glass substrate 40 has a thickness of 0.7 mm. Meanwhile, the partition wall material 81 is thermally cured or UV cured to form partition walls 81'. When UV curing is adopted, the UV light transmits through the glass substrate 40 and not the opaque mold 80.

Figure 8E:
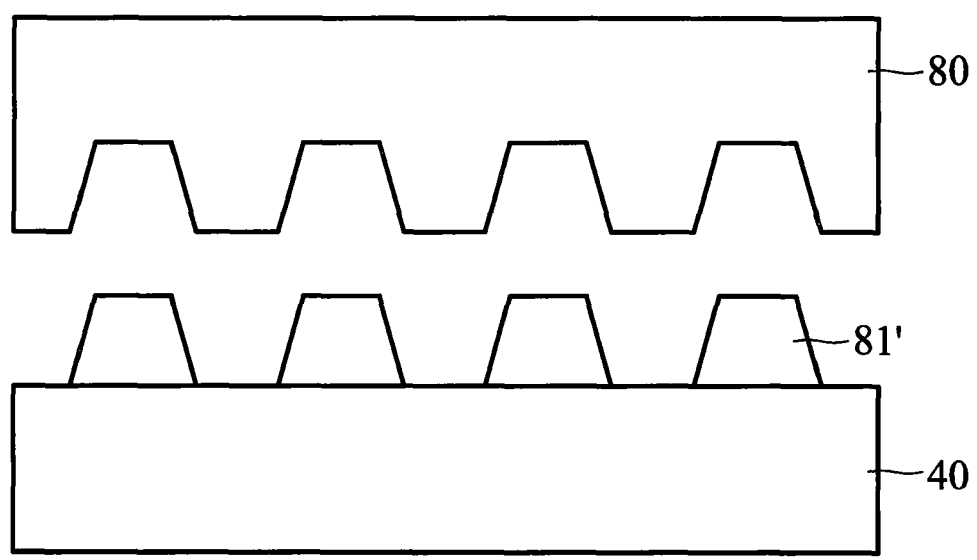

As shown in FIG. 8E, the partition walls 81' is formed on the glass substrate 40, and the mold 80 is de-molded. The partition walls 81' may have an optimum profile without other partition wall material residue by controlling speed, temperature, angle, and/or other factors of the de-molding process.

FIGS. 9A-9E show a method for defining partition walls in one embodiment of the disclosure.

Figure 9A:
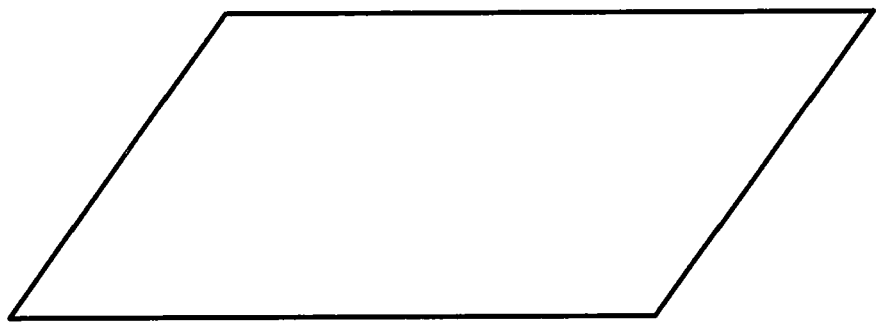
FIGS. 9A-9E show a method for defining partition walls in one embodiment of the disclosure.
Figure 9B:
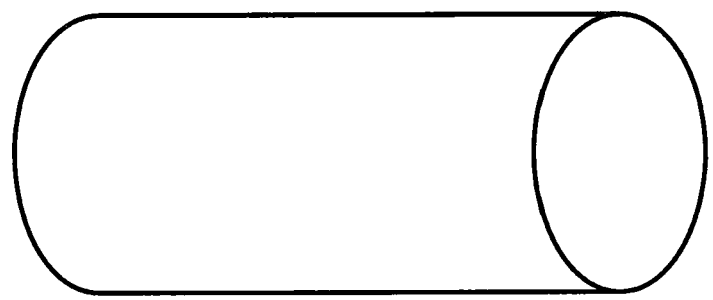
Figure 9C:
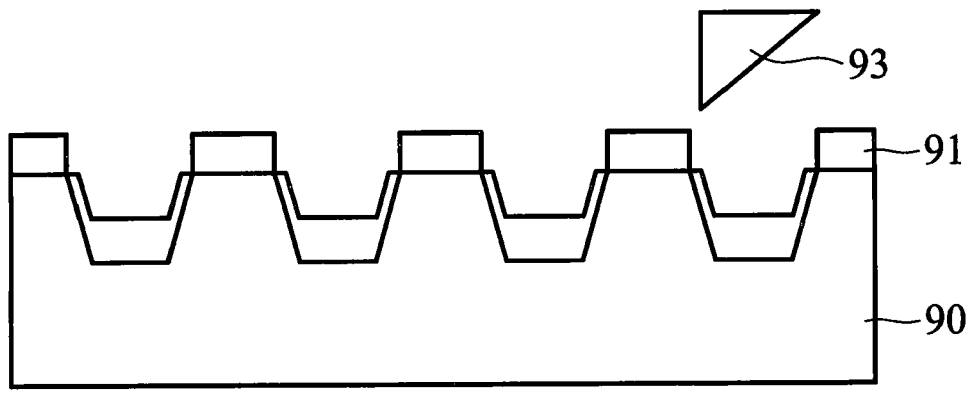

As shown in FIG. 9C, a partition wall material 91 is conformally formed on a surface of a mold 90 by a scraper 93. The partition wall material 91 has a thickness of 10 μm to 500 μm, wherein the thickness is controlled by the empty space between the scraper 93 and the mold 90. The mold 90 may be sheet-like as shown in FIG. 9A or cylinder-like as shown in FIG. 9B. The mold 90 may be processable material such as copper, aluminum, silicon wafer, or the likes.

Figure 9D:
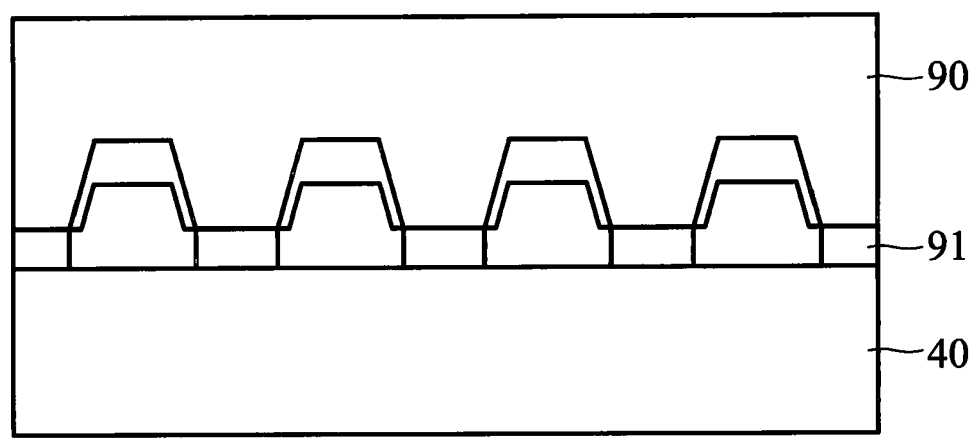

As shown in FIG. 9D, the mold 90 with the partition wall material 91 formed on its surface is flip pressed on a glass substrate 40. The flip pressing process is performed with average pressure. The glass substrate 40 has a thickness of 0.7 mm. Meanwhile, the partition wall material 91 is thermally cured or UV cured to form partition walls 91'. When UV curing is adopted, the UV light transmits through the glass substrate 40.

Figure 9E:
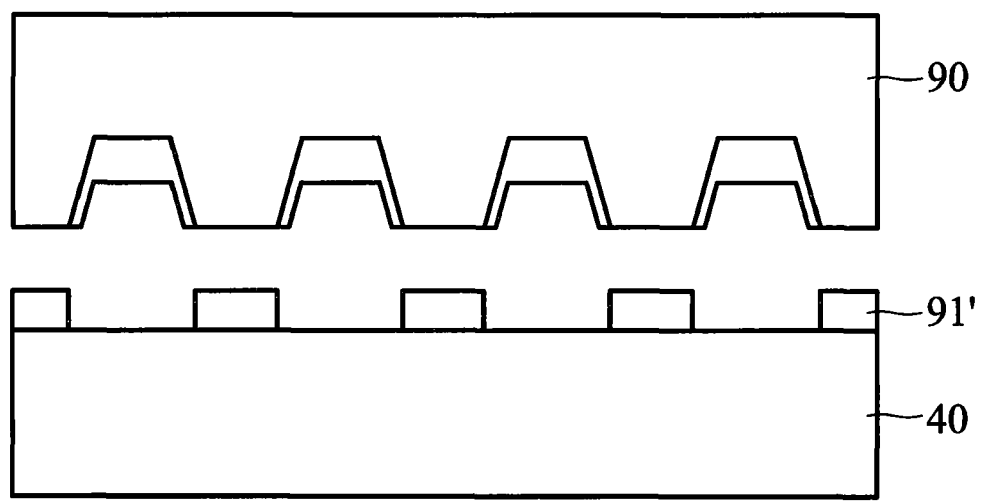

As shown in FIG. 9E, the partition walls 91' are formed on the glass substrate 40, and the mold 90 is de-molded. The partition walls 91' may have an optimum profile without other partition wall material residue by controlling speed, temperature, angle, and/or other factors of the de-molding process.

FIGS. 10A-10F show a method for manufacturing a flexible three-dimensional image display device in one embodiment of the disclosure.

Figure 10A:
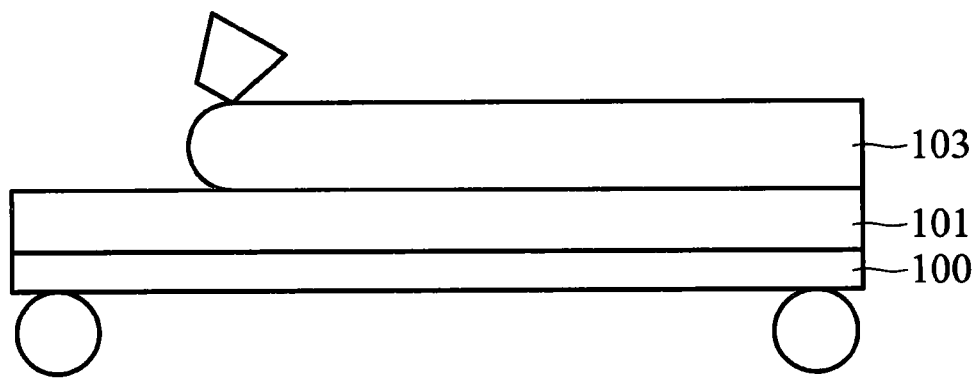
FIGS. 10A-10F show a method for manufacturing a flexible three-dimensional image display device in one embodiment of the disclosure.

As shown in FIG. 10A, a partition wall material 103 is formed on a transparent flexible substrate 101 by slit die coating. A carrier 100 is formed under the transparent flexible substrate 101 to be transported by rollers 105, which is a so-called roll-to-roll process. The partition wall material 103 having a thickness of 20 μm to 500 μm is put on a hot plate to soft-bake at a suitable temperature for 5 minutes to 10 minutes.

Figure 10B:
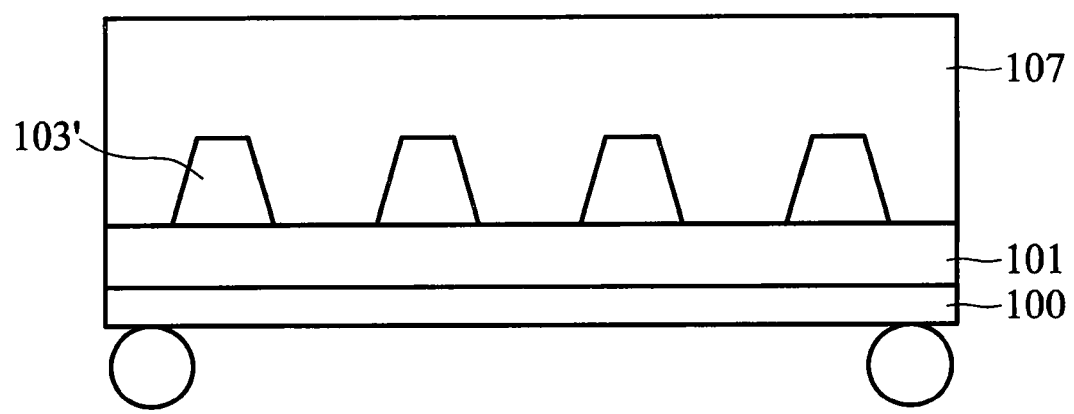

As shown in FIG. 10B, a mold 107 is applied an average pressure to be pressed on the partition wall material 103. The imprinting process may be an embossing or planar pressing process. The mold 107 may be processable material such as copper, aluminum, silicon wafer, or the likes. Meanwhile, the imprinted partition wall material 103 is thermally cured or UV cured to form partition walls 103'. When UV curing is adopted, the UV light transmits through the carrier 100 and the transparent flexible substrate 101.

Figure 10C:
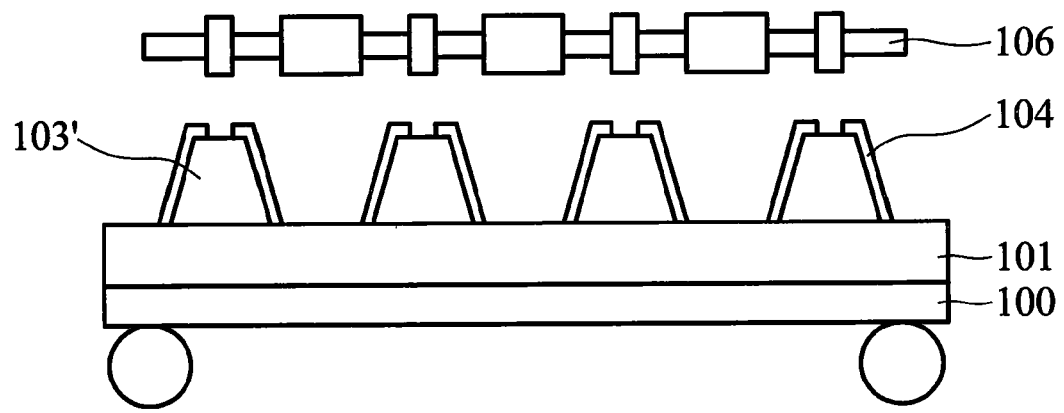

As shown in FIG. 10C, the mold 107 is then removed after forming the partition walls 103'. Thereafter, electrodes 104 are deposited on the partition walls 103' by physical vapor deposition (PVD) and a shadow mask 106. The electrodes 104 may have a thickness of 5 nm to 5000 nm. The electrodes 104 may be Ag, ITO, AZO, or IGZO.

Figure 10D:
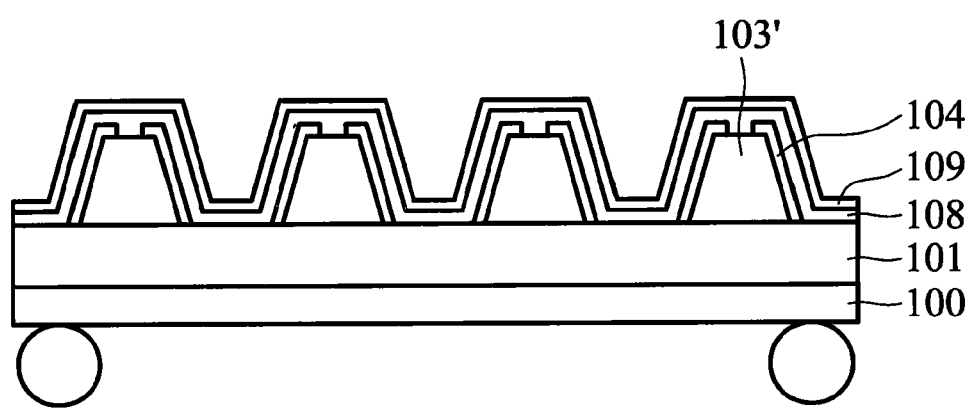

As shown in FIG. 10D, a dielectric layer 108 such as 500 nm to 3000 nm of Parylene C 5 nm to 1000 nm of or $SiO_2$ or $Al_2O_3$ is deposited by PVD on the structure of FIG. 10C. Thereafter, a hydrophobic layer 109 is spin-coated or dip coated on the dielectric layer 108. The hydrophobic layer 109 may be Teflon AF 1601 commercially available from Dupont or CYTOP-809M commercially available from Asahi. The hydrophobic layer 109 has a thickness of 50 nm to 1000 nm.

Figure 10E:
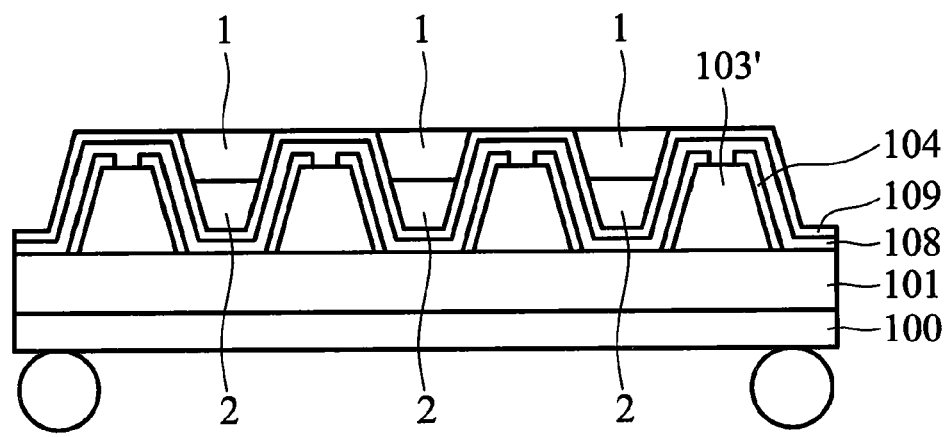

As shown in FIG. 10E, a polar light modulating medium 1 and a non-polar modulating medium 2 are injected into the compartments between the partition walls 103' by a fluid injector (Dimatix DMP-2800 commercially available from Fujitsu). The non-polar light modulating medium 2 may be a viscosity of less than 50 cP. Alternatively, non-polar light modulating medium 2 may be air, such that the combination of the light modulating mediums may be polar light modulating medium 1 (e.g. water) and air.

Figure 10F:
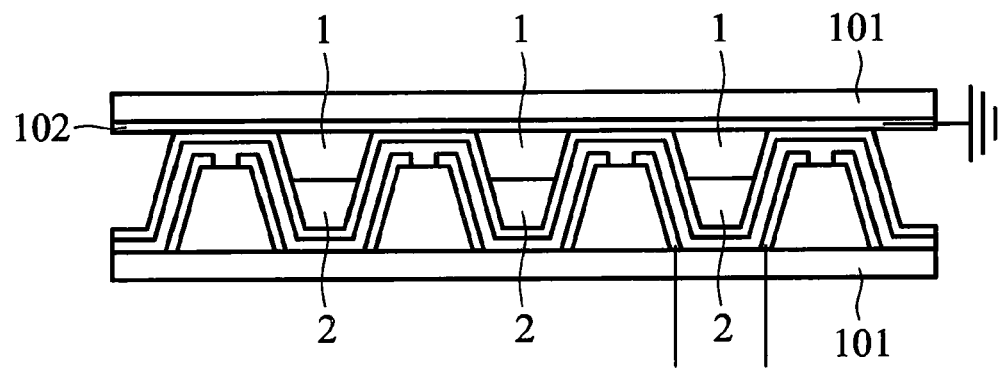

As shown in FIG. 10F, an layer 102 is applied to bond the structure of FIG. 10E to another transparent flexible substrate 101. The misalignment of this bonding process may be less than 10 μm. Thereafter, the carrier 100 is removed.

The electrodes 104 may be formed by other methods such as screen printing or inject printing methods. For example, the electrodes 104 may be a 5 nm to 5000 nm film of silver gel, copper gel, or carbon gel.

When a voltage is applied to the electrodes 104 of the electrically switchable light modulating cells, the interface profile between the polar light modulating medium 1 and the non-polar light modulating medium 2 may non-horizontally deform, such that a light travelling from the bottom transparent flexible substrate 101 to the top transparent flexible substrate 101 may be deflected to a right eye or a left eye of a viewer. As such, the viewer may see three-dimensional images.

Figure 11A:
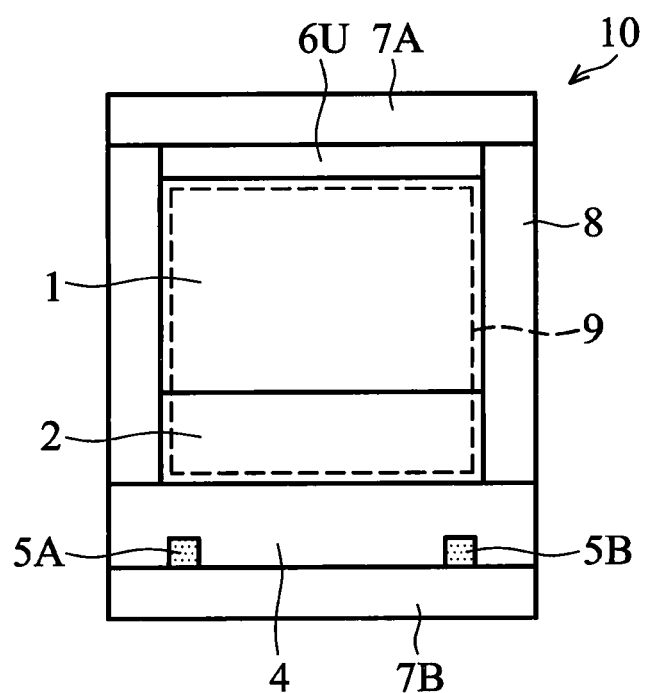
FIGS. 11A-11D, 12A-12B, 13A-13C, 14, 15A-15E, 16A-16D, 17, and 18 show electrically switchable light modulating cells in embodiments of the disclosure.
Figure 12A:
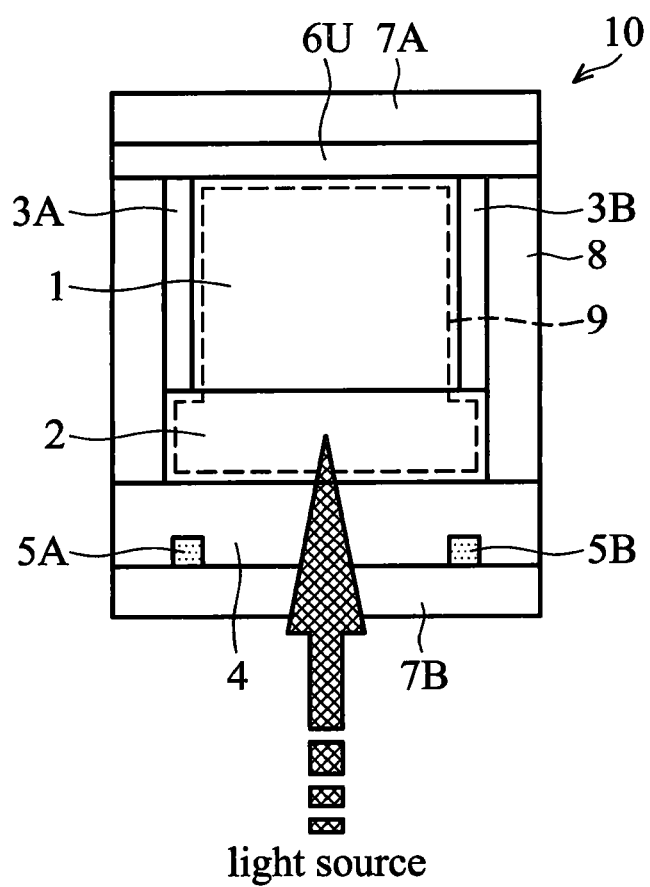
Figure 12B:
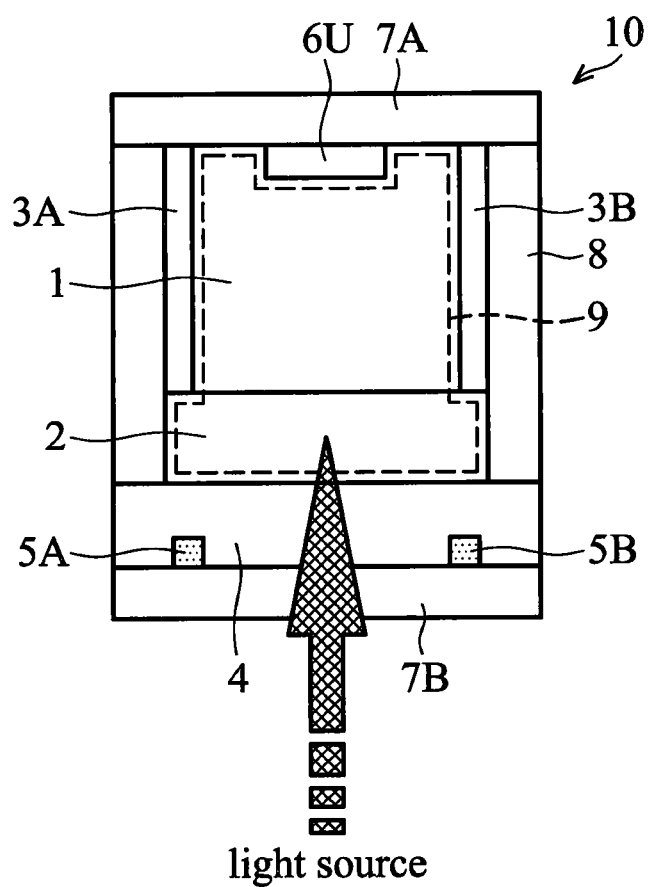

FIG. 11A shows an electrically switchable light modulating cell 10 in one embodiment of the disclosure, which includes a bottom substrate 7B, a top substrate 7A, a left electrode 5A, a right electrode 5B, a dielectric layer 4, partition walls 8, a top electrode 6U, a polar light modulating medium 1, and a non-polar light modulating medium 2. The left electrode 5A and right electrode 5B is disposed on the bottom substrate 7B, and the dielectric layer 4 is disposed on the bottom substrate 7B to cover the left and right electrodes 5A and 5B. The partition walls 8 are disposed on the dielectric layer 4, the top substrate 7A is disposed on the partition walls 8 to be opposite to the bottom substrate 7B, and the top electrode 6U is disposed on the top substrate 7A. The dielectric layer 4, the top electrode 6U, and the partition walls 8 define a compartment 9 which is dimensioned, such that capillarity is facilitated. The polar light modulating medium 1 and the non-polar light modulating medium 2 filled in the compartment 9 are incompatible each other. That is, the polar light modulating medium 1 and the non-polar light modulating medium 2 are substantially immiscible and of different refractive indices. One of the polar light modulating medium 1 and the non-polar light modulating medium 2 is a gaseous medium. The polar and non-polar light modulating media 1 and 2 may deform corresponding to voltages applied to the left and right electrodes 5A and 5B and the top electrode 6U, such that a light travelling through the compartment 9 may be deflected to a right eye or a left eye of a viewer. As such, the viewer may see three-dimensional images. The light as shown in FIGS. 12A and 12B is emitted from a light source including but not limited to a cold cathode fluorescent lamps (CCFL) backlight module, or an organic light emitting diode (OLED) backlight module. Specifically, the size and geometrical structure of the partition walls 8 may enforce the capillary force between the partition walls 8 and the polar light modulating medium 1. Accordingly, the polar light modulating medium 1 may not easily mix and/or be misplaced with the non-polar light modulating medium 2 due to the enforced capillary force. At least one of the bottom substrate 7B and the partition wall 8 wettable by at least one of the polar light modulating medium 1 and the non-polar light modulating medium 2. As shown in FIGS. 12A and 12B, hydrophilic layers 3A and 3B, (high-contact—angle material layer) may be disposed on parts of the partition walls 8 to be adjacent to the top electrode 6U. The hydrophilic property of the hydrophilic layers 3A and 3B may attract the polar light modulating medium 1, thereby reducing or eliminating misplacement occurrences of the polar and non-polar light modulating mediums 1 and 2. Furthermore, as shown in FIG. 12A, the top electrode 6U is a common electrode and disposed on the partition walls 8 and the hydrophilic layers 3A and 3B. Unlike FIG. 12A, FIG. 12B shows that the top electrode 6U is a segmented electrode and the top substrate 7A is disposed on the partition walls 8 and adjacent to hydrophilic layers 3A and 3B.

Figure 11B:
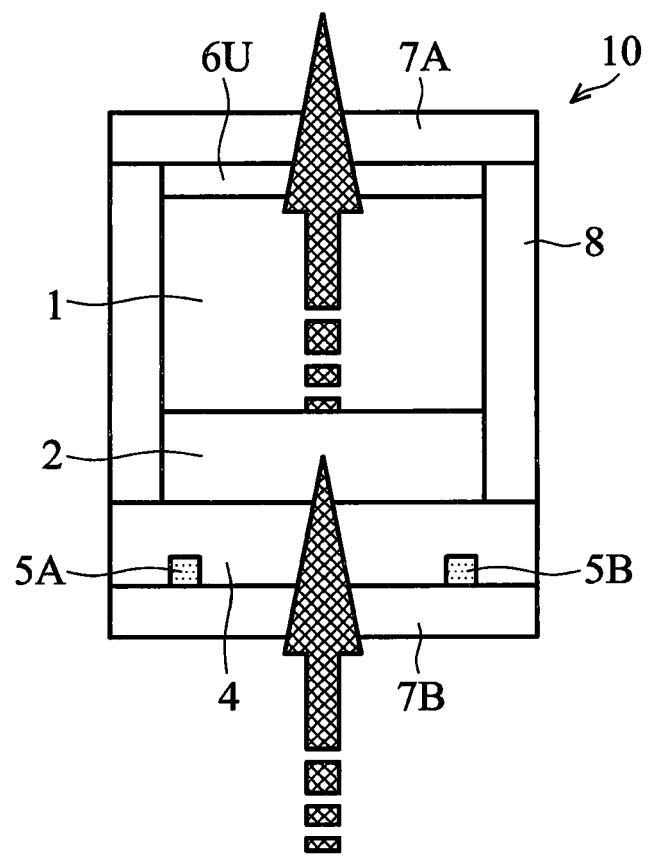
Figure 11C:
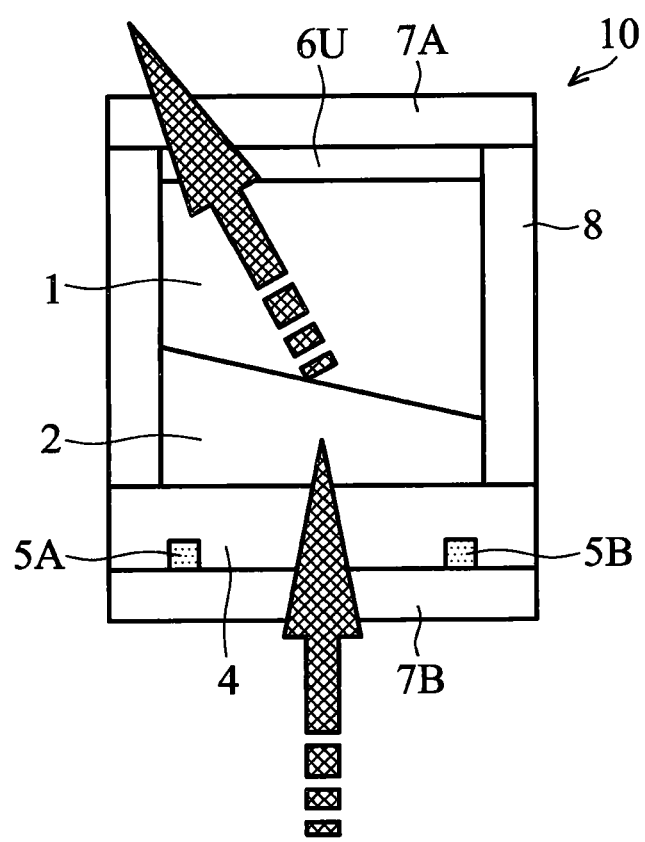
Figure 11D:
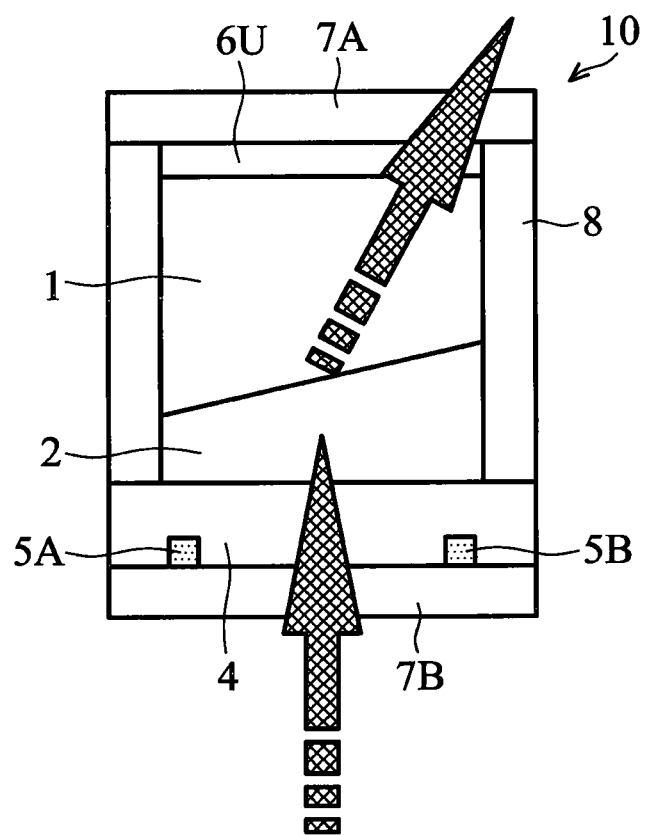

FIGS. 11B-11D show the light deflection mechanism of the electrically switchable light modulating cell 10 in FIG. 11A. When no voltage is applied to the electrically switchable light modulating cell 10, the interface between the polar and non-polar light modulating mediums is horizontal. Therefore, a light traveling through the compartment 9 may not be deflected. When a voltage difference is applied between the left electrode 5A and the top electrode 6U, the polar light modulating medium 1 may tilt to a left electrode 5A and repel the non-polar light modulating medium 2, as shown in FIG. 11D. The interface between the polar and non-polar light modulating mediums 1 and 2 non-horizontally deforms. As such, a light traveling through the compartment 9 may be deflected to the right. Similarly, when a voltage difference is applied between the right electrode 5B and the top electrode 6U, the polar light modulating medium 1 may tilt to a right electrode 5A and repel the non-polar light modulating medium 2, as shown in FIG. 11C. The interface between the polar and non-polar light modulating mediums 1 and 2 non-horizontally deforms. As such, a light traveling through the compartment 9 may be deflected to the left.

The surface of the partition walls 8 may be non-streamline shaped, specifically, adjacent to the interface between the polar and non-polar light modulating mediums 1 and 2, to avoid misplacement of the polar and non-polar light modulating mediums 1 and 2. This design may make the polar and non-polar light modulating mediums 1 and 2 preserve a balanced status rather than a misplaced status (top-bottom reverse or front-back reverse) when no voltage is applied to the electrodes.

Figure 13A:
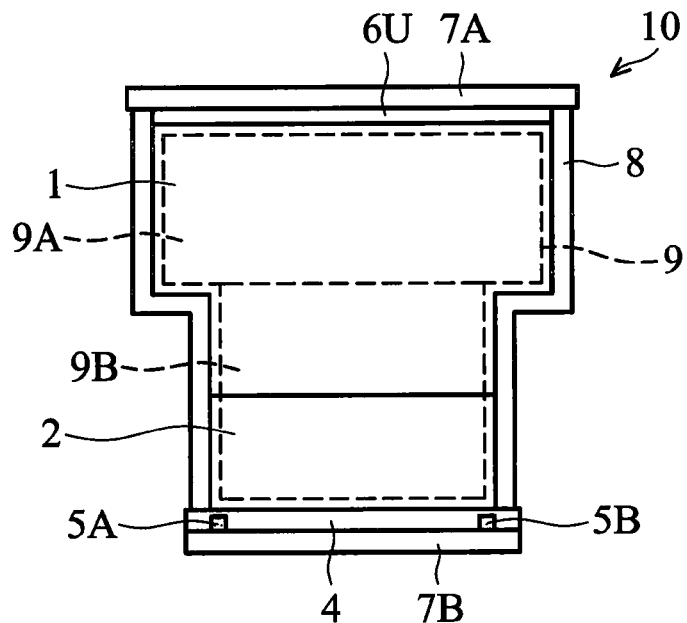
Figure 13B:
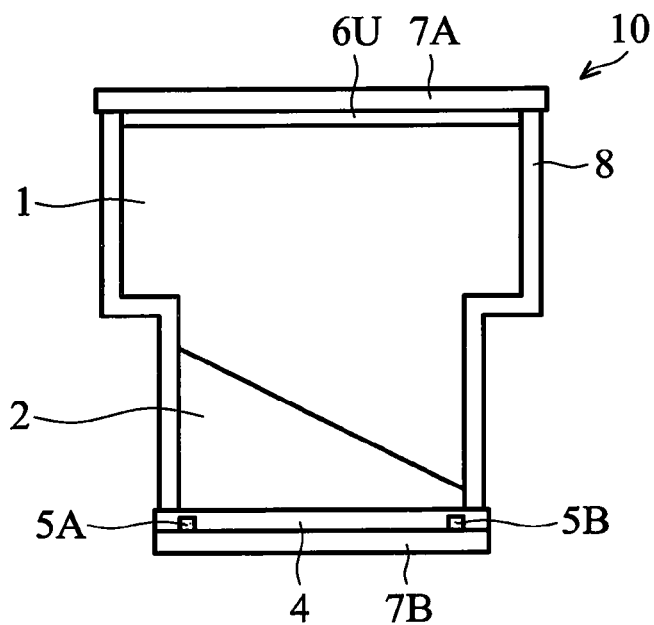
Figure 13C:
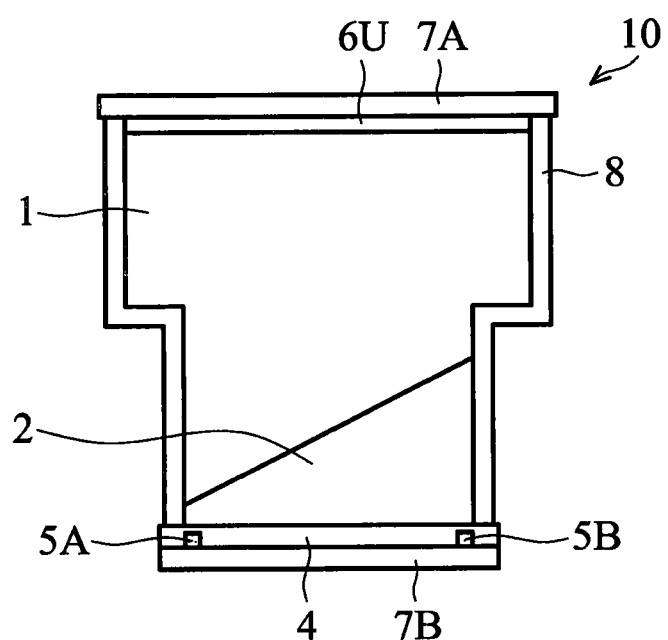

The compartment 9 of the electrically switchable light modulating cell 10 in FIG. 13A has a stepped structure composed of a top portion 9A and a bottom portion 9B. The top portion 9A in FIG. 13A has a rectangular-shaped cross-sectional side view. The bottom portion 9B in FIG. 13A also has a rectangular-shaped cross-sectional side view, and the top portion 9A is wider than the top portion 9B. The deformed polar light modulating medium 1 may be contained in the top portion 9A without escaping to the bottom portion 9B, as shown in FIGS. 13B and 13C. As a result, misplacement of the polar and non-polar light modulating mediums 1 and 2 may be avoided.

Figure 14:
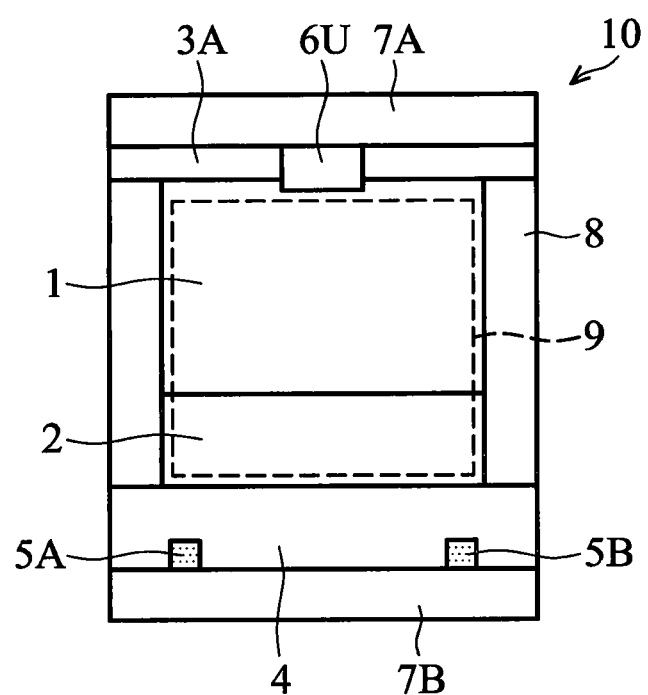

FIG. 14 shows an electrically switchable light modulating cell 10 in one embodiment of the disclosure, which includes a polar light modulating medium 1, a non-polar light modulating medium 2, a hydrophilic layer (high contact angle layer) 3A, a dielectric layer 4, a left electrode 5A, a right electrode 5B, a top electrode 6U, a bottom substrate 7B, a top substrate 7A, and partition walls 8. The left electrode 5A and right electrode 5B are disposed on the bottom substrate 7B, and the dielectric layer 4 is disposed on the bottom substrate 7B to cover the left and right electrodes 5A and 5B. The partition walls 8 are disposed on the dielectric layer 4, the hydrophilic layer 3A is disposed on the partition walls 8 to be opposite to the bottom substrate 7B, and the top electrode 6U is disposed on the top substrate 7A to be surrounded by the hydrophilic layer 3A. The dielectric layer 4, the top electrode 6U, the hydrophilic layer 3A, and the partition walls 8 define a compartment 9. The polar light modulating medium 1 and the non-polar light modulating medium 2 filled in the compartment 9 are incompatible to each other. That is, the polar light modulating medium 1 and the non-polar light modulating medium 2 are substantially immiscible and of different refractive indices, and the compartment 9 is dimensioned as to facilitate capillarity. The polar and non-polar light modulating media 1 and 2 may deform corresponding to voltages applied to the left and right electrodes 5A and 5B and top electrode 6U, such that a light travelling through the compartment 9 may be deflected to a right eye or a left eye of a viewer. As such, the viewer may see three-dimensional images. In this embodiment, the polar light modulating medium 1 is easily adsorbed by the hydrophilic layer 3A. This means that the polar light modulating medium 1 is easily limited in the top portion of the compartment 9, and the non-polar light modulating medium is easily limited in the bottom portion of the compartment 9. As a result, misplacement of the polar and non-polar light modulating media 1 and 2 may be avoided, and the partition wall is wettable by at least one of the polar and non-polar light modulating media 1 and 2.

Figure 15A:
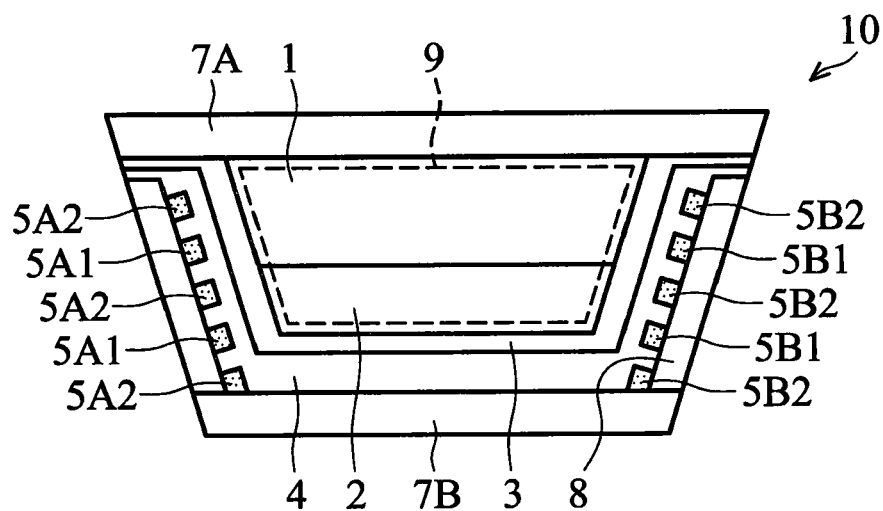

FIG. 15A shows an electrically switchable light modulating cell 10 in one embodiment of the disclosure, which includes a polar light modulating medium 1, a non-polar light modulating medium 2, a dielectric layer 4, left electrodes 5A1 and 5A2, right electrodes 5B1 and 5B2, a bottom substrate 7B, a top substrate 7A, and partition walls 8. The electrically switchable light modulating cell 10 has a reverse trapezoid-shaped cross-sectional side view. The left electrodes 5A1 and 5A2 and the right electrodes 5B1 and 5B2 are disposed on two partition walls 8, respectively. The dielectric layer 4 is disposed to cover the left electrodes 5A1 and 5A2, the right electrodes 5B1 and 5B2, and the bottom substrate 7B. Besides, a hydrophobic layer 3 may be disposed on the dielectric layer 4 as shown in FIG. 15A. The top substrate 7A is disposed on the hydrophobic layer 3 so that the top substrate 7A is separated from the partition wall 8 by the hydrophobic layer 3 and the dielectric layer 4. The top substrate 7A is disposed on the hydrophobic layer 3 to be adjacent to the partition wall 8, the dielectric layer 4, the left electrodes 5A1 and 5A2, and the right electrodes 5B1 and 5B2. Thus, the top substrate 7A and the hydrophobic layer 3 define a compartment 9 to contain a polar light modulating medium 1 and a non-polar light modulating medium 2. In addition, the polar light modulating medium 1 and a non-polar light modulating medium 2 are substantially immiscible and are of different refractive indices. The partition walls 8 may be manufactured by semiconductor processes such as exposure, development, etching, and evaporation processes, or an imprinting process as described above.

Figure 15B:
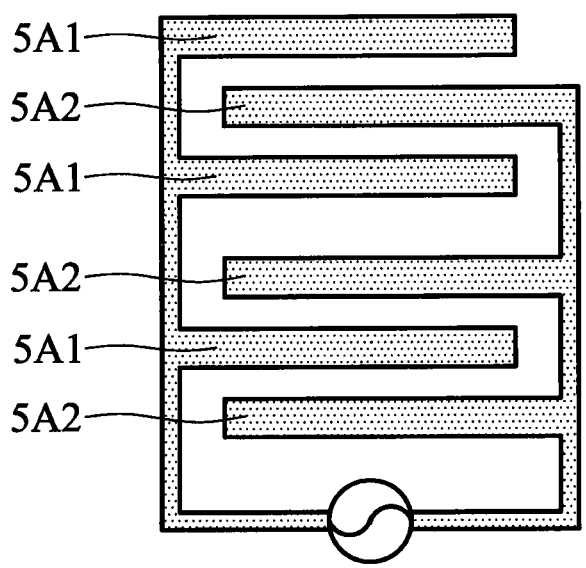
Figure 15C:
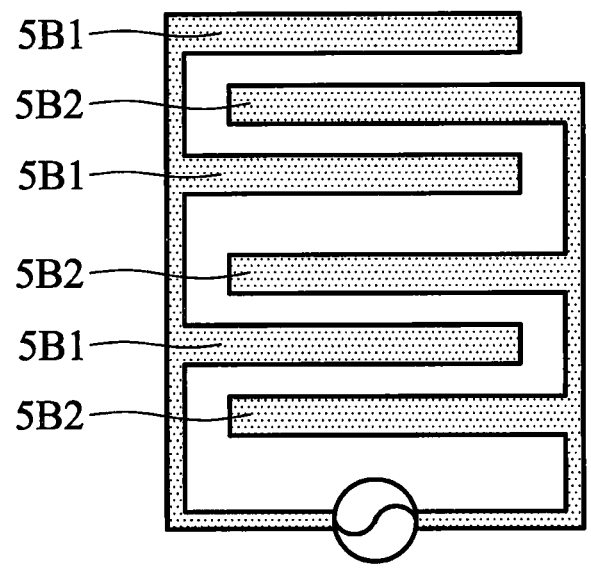
Figure 15D:
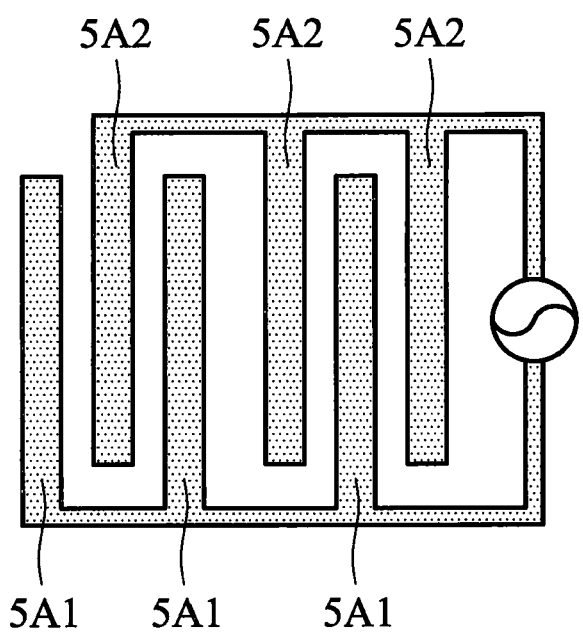
Figure 15E:
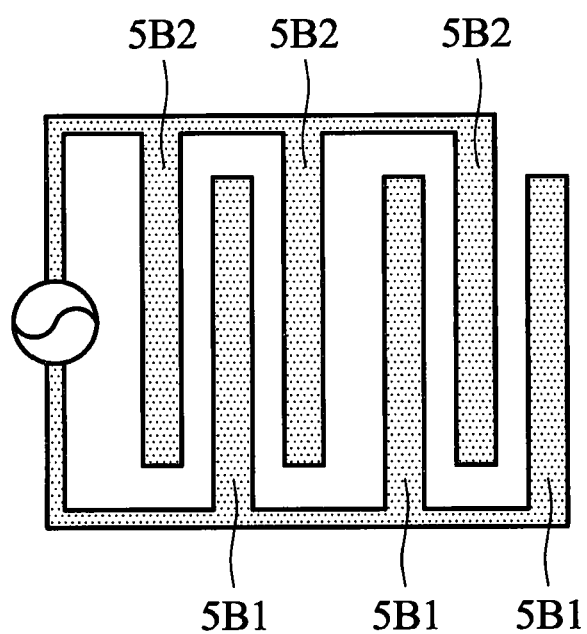

Further referring to FIG. 15A, electrodes 5A1 and 5A2 are interlaced to each other as shown in a side view (FIG. 15B) and a top view (FIG. 15D) and comprise finger-shaped portions. Similarly, the right electrodes in FIG. 15A are separated to electrically connected electrodes 5B1 and 5B2, which are interlaced to each other as shown in a side view (FIG. 15C) and a top view (FIG. 15E). Alternatively, electrodes 5A and 5B are spirals and interlaced connected to each other as shown in FIG. 15F. This design may accurately control the interface position between the polar and non-polar light modulating mediums 1 and 2. Specifically, the electrodes 5A1 and 5A2 are controlled by an alternate current transformer, and the electrodes 5B1 and 5B2 are controlled by another alternative current transformer. In other words, the interlaced electrodes 5A1 and 5A2 and the interlaced electrodes 5B1 and 5B2 are controlled by two independent AC transformers, respectively. When a bias voltage is applied to the electrodes 5A1 and 5A2, the interface between the polar and non-polar light modulating mediums 1 and 2 contacts the hydrophobic layer 3 at a contact angle $\theta 1$. When a bias voltage is applied to the electrodes 5B1 and 5B2, the interface between the polar and non-polar light modulating mediums 1 and 2 contacts the hydrophobic layer 3 at a contact angle $\theta 2$. Because the electrodes 5A and 5B are interlaced, the interface between the polar and non-polar light modulating mediums 1 and 2 may not be located at a position not corresponding to the electrodes. Accordingly, the interface between the polar and non-polar light modulating mediums 1 and 2 may be controlled at a position corresponding to one electrode, and the position and angle thereof may be accurately controlled. As a result, the electrically switchable light modulating cell 10 may accurately control a deflection angle of a light traveling therethrough. In other embodiments, the partition walls 8 tilting at an angle of 30° to 90° may simplify the fabrication of the interlaced electrodes.

Figure 16A:
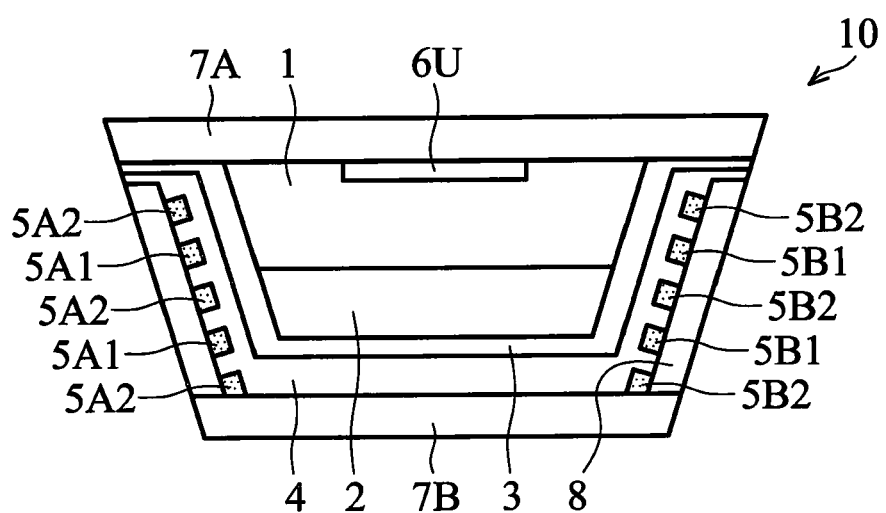
Figure 16B:
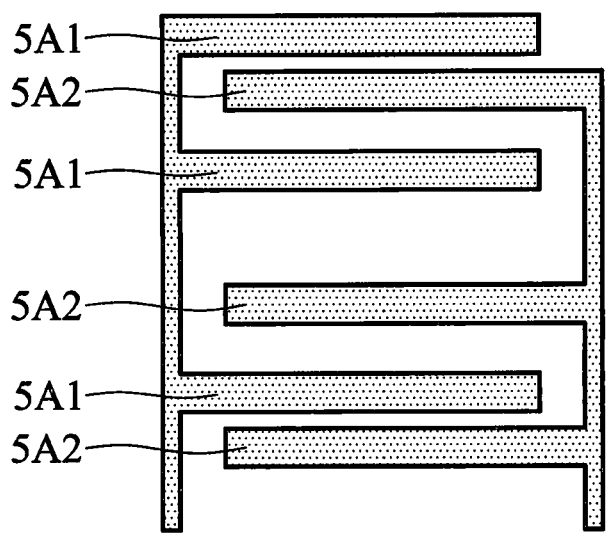
Figure 16C:
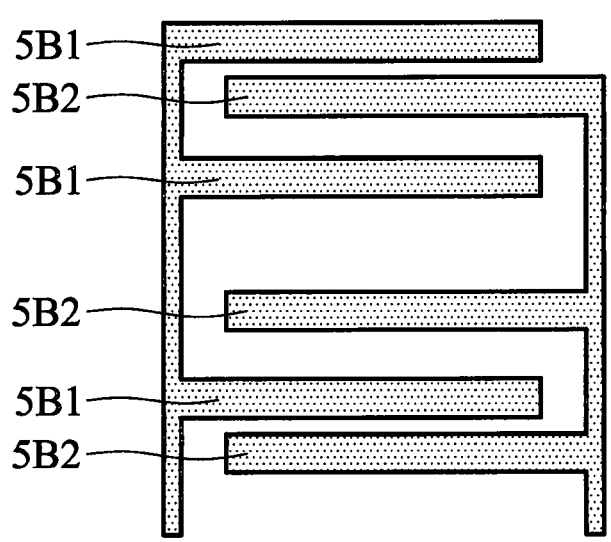
Figure 16D:
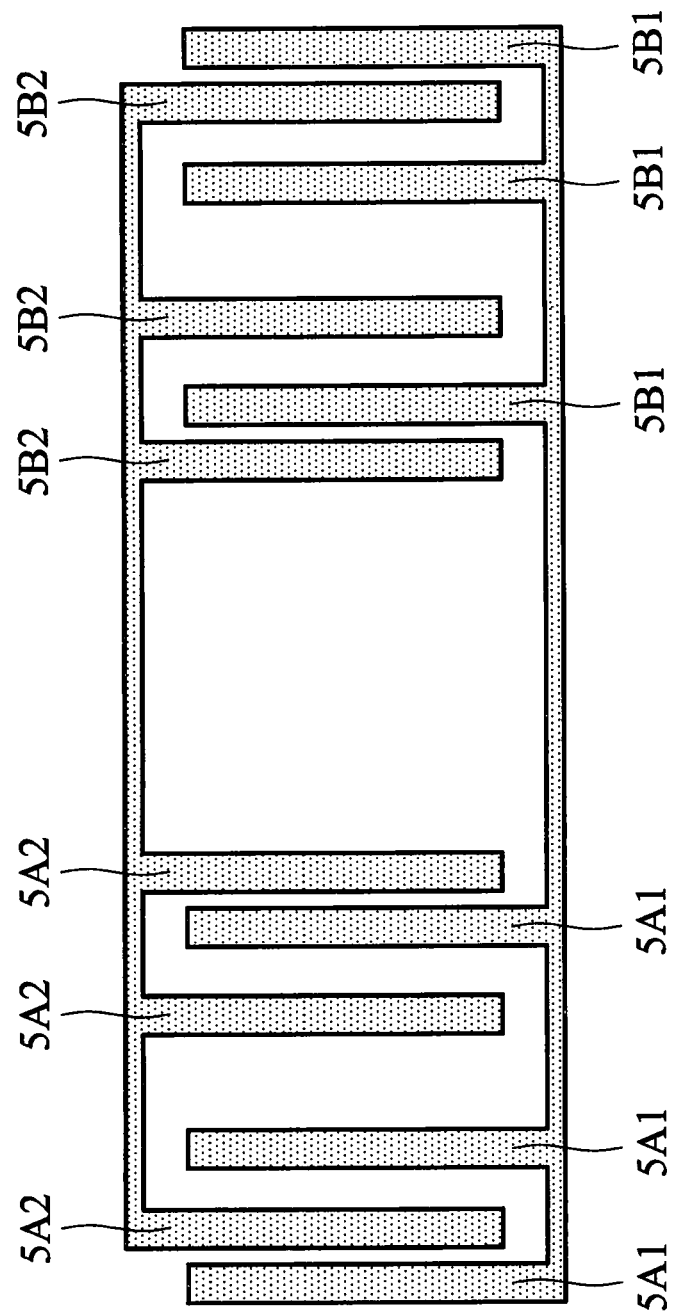

The electrically switchable light modulating cell 10 in FIG. 15A may further include a top electrode 6U on the top substrate 7A, as shown in FIG. 16A. The top electrode 6U is used to apply a voltage to the polar light modulating medium 1. The left electrode in FIG. 16A is separated into electrodes 5A1 and 5A2, which are parallel to each other as shown in a side view (FIG. 16B) and a top view (FIG. 16D). The right electrode in FIG. 16A is separated into electrodes 5B1 and 5B2, which are parallel to each other as shown in a side view (FIG. 16C) and a top view (FIG. 16D). As shown in FIG. 16D, the electrodes 5A1 are electrically connected to the electrodes 5B1, and the electrodes 5A2 is electrically connected to the electrodes 5B2, respectively. The adjacent electrodes 5A1 and 5A2 (or 5B1 and 5B2) are separated by an equal distance or different distances. The interface between the polar and non-polar light modulating media 1 and 2 may be controlled at a position corresponding to one electrode, and the position and angle thereof may be accurately controlled. Specifically, the bias voltage between the top electrode 6U and the electrodes 5A1 and 5B1 (or the electrodes 5A2 and 5B2) may make the interface between the polar and non-polar light modulating media 1 and 2 symmetrically tilt. In this embodiment, the electrically switchable light modulating cell 10 may modulate the focus, and tilt the interface between the polar and non-polar light modulating media toward a right side or a left side. Because the electrodes 5A1 and 5A2 (and 5B1 and 5B2) are interlaced, the interface between the polar and non-polar light modulating mediums 1 and 2 may not be located at a position free of the electrodes. As such, the position and angle of the interface between the polar and non-polar light modulating media 1 and 2 may be accurately controlled.

Figure 17:
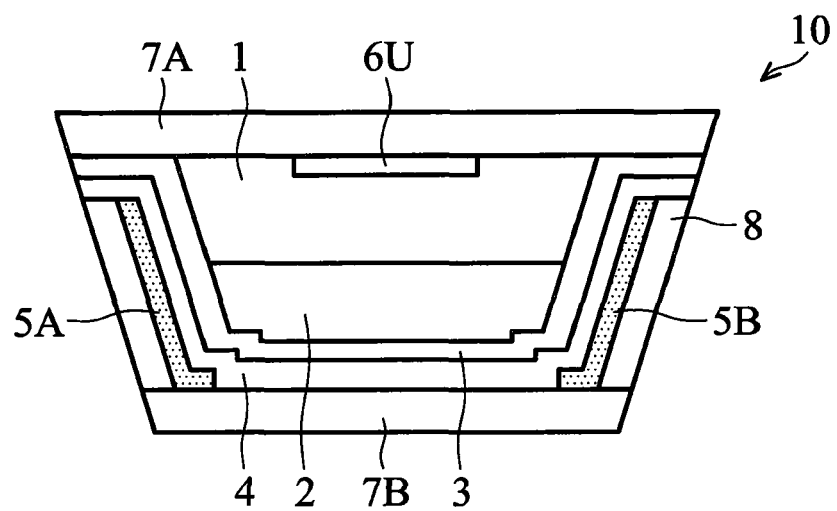

FIG. 17 shows an electrically switchable light modulating cell 10 in one embodiment of the disclosure, which includes a polar light modulating medium 1, a non-polar light modulating medium 2, a hydrophobic layer 3, a dielectric layer 4, a left electrode 5A, a right electrode 5B, a bottom substrate 7B, a top substrate 7A, and partition walls 8. The electrically switchable light modulating cell 10 has a reverse trapezoid-shaped cross-sectional side view. The left electrode 5A and the right electrode 5B disposed on two partition walls 8 extend on right and left parts of the bottom substrate 7B, respectively. The dielectric layer 4 is conformably disposed on the left electrode 5A, the right electrode 5B, and the bottom substrate 7B. The hydrophobic layer 3 may be disposed on the dielectric layer 4 of the electrically switchable light modulating cell 10. The top substrate 7A is disposed on the dielectric layer 4 so that the top substrate 7A is separated from the left electrode 5A, the right electrode 5B, and the partition wall 8 by the dielectric layer 4. Furthermore, the hydrophobic layer 3 helps to move the interface between the polar and non-polar light modulating media 1 and 2, thereby reducing the working voltage of the electrically switchable light modulating cell 10. The top substrate 7A and the hydrophobic layer 3 define a compartment 9 to contain a polar light modulating medium 1 and a non-polar light modulating medium 2.

Further referring to FIG. 17, the electrically switchable light modulating cell 10 may further include a top electrode 6U on the top substrate 7A. When a bias voltage is applied to the electrodes, the interface between the polar and non-polar light modulating mediums 1 and 2 contacts the hydrophobic layer 3 at a contact angle θ2. Because the electrodes 5A and 5B are interlaced, the interface between the polar and non-polar light modulating mediums 1 and 2 may not be located at a position not corresponding to the electrodes. Accordingly, the interface between the polar and non-polar light modulating mediums 1 and 2 may be controlled at a position corresponding to one electrode, and the position and angle thereof may be accurately controlled. Thus, the electrically switchable light modulating cell 10 may accurately control a deflection angle of a light traveling therethrough. In other embodiments, the partition walls 8 tilting at an angle of 30° to 90° may simplify the fabrication of the interlaced electrodes.

Figure 18:
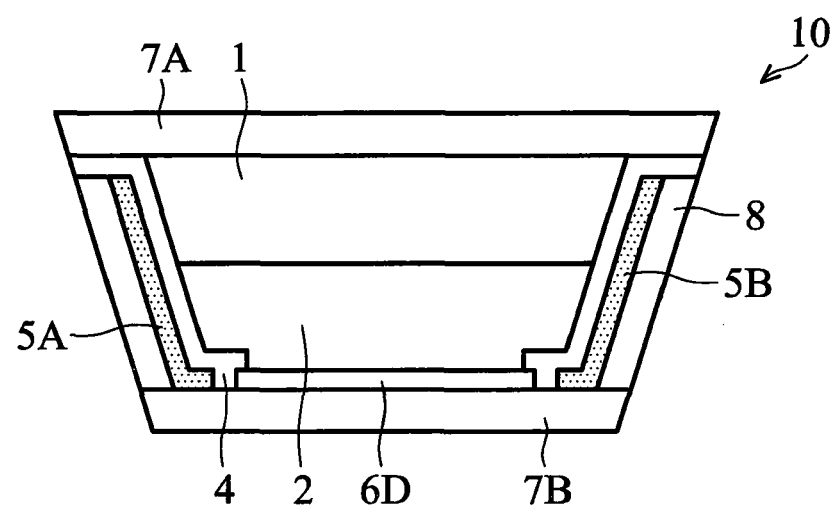

FIG. 18 shows an electrically switchable light modulating cell 10 in one embodiment of the disclosure, which includes a polar light modulating medium 1, a non-polar light modulating medium 2, a hydrophobic layer 3, a dielectric layer 4, a left electrode 5A, a right electrode 5B, a bottom electrode 6D, a bottom substrate 7B, a top substrate 7A, and partition walls 8. The electrically switchable light modulating cell 10 has a reverse trapezoid-shaped cross-sectional side view. The left electrode 5A and the right electrode 5B disposed on two partition walls 8 extend on right and left parts of the bottom substrate 7B, respectively. The bottom electrode 6D is disposed on the bottom substrate 7B. The dielectric layer 4 is disposed on the left electrode 5A, the right electrode 5B, a part of the bottom substrate 7B, a part of the partition walls 8, and a part of the bottom electrode 6D. The top substrate 7A is disposed on the dielectric layer 4 so that the top substrate 7A is separated from the partition walls 8, the left electrode 5A, and the right electrode 5B by the dielectric layer 4. The top substrate 7A and, the bottom electrode 6D, and the dielectric layer 4 define a compartment 9 to contain a polar light modulating medium 1 and a non-polar light modulating medium 2. In addition, the polar light modulating medium 1 and a non-polar light modulating medium 2 are substantially immiscible and are of different refractive indices. The dielectric layer 4 may be surface treated by a physical method, such that the dielectric layer 4 surface may have a roughness to reduce its surface energy. Similarly, the dielectric layer 4 may be surface treated by a chemical method to have a hydrophobic surface.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically switchable light modulating cell, comprising:
    a first substrate;
    a partition wall disposed on the first substrate;
    a first electrode, disposed on part of the partition wall and on part of the first substrate, comprising two portions interlaced with each other;
    a second electrode, disposed on another part of the partition wall and on another part of the first substrate, comprising two portions interlaced with each other;
    a dielectric layer conformably formed on the first and second electrodes;
    a second substrate, wherein the second substrate and the dielectric layer define a compartment; and
    a first and second light modulating media filled in the compartment, wherein the first and second light modulating media are substantially immiscible and are of different refractive indices.

2. The electrically switchable light modulating cell of claim 1, further comprising a third electrode formed on the second substrate.

3. The electrically switchable light modulating cell of claim 1, wherein the first and second light modulating media are adapted to adjust the directions of light beams travelling from the first substrate to the second substrate in accordance with an electric potential difference across the first electrode and the second electrode.

4. The electrically switchable light modulating cell of claim 2, wherein the light beams alternately arrive at either the left eye of a viewer or the right eye of the viewer to form an autostereoscopic image perceivable to the viewer.

5. The electrically switchable light modulating cell of claim 1, further comprising a high-contact-angle material layer formed on the dielectric layer.

* * * * *